(12) United States Patent
Tanaka et al.

(10) Patent No.: US 7,816,805 B2
(45) Date of Patent: Oct. 19, 2010

(54) POWER SUPPLY SYSTEM WITH MULTIPHASE MOTOR AND MULTIPHASE INVERTER

(75) Inventors: Katsunori Tanaka, Ichinomiya (JP); Yukari Tanaka, legal representative, Ichinomiya (JP); Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 201 days.

(21) Appl. No.: 12/274,445

(22) Filed: Nov. 20, 2008

(65) Prior Publication Data

US 2009/0134700 A1    May 28, 2009

(30) Foreign Application Priority Data

Nov. 22, 2007    (JP) .............................. 2007-303707

(51) Int. Cl.
*B60L 1/08* (2006.01)
(52) U.S. Cl. .................................................. 307/10.1
(58) Field of Classification Search ............... 307/9.1, 307/10.1, 43, 45, 46, 57
See application file for complete search history.

(56) References Cited

U.S. PATENT DOCUMENTS

| | | | |
|---|---|---|---|
| 3,866,099 A * | 2/1975 | Bourbeau | 318/400.27 |
| 6,066,928 A | 5/2000 | Kinoshita et al. | |
| 6,137,704 A | 10/2000 | Ito et al. | |
| 6,320,775 B1 | 11/2001 | Ito et al. | |
| 6,476,571 B1 | 11/2002 | Sasaki | |
| 7,608,940 B2 * | 10/2009 | Osawa | 307/10.7 |
| 7,710,067 B2 * | 5/2010 | Kosaka et al. | 318/812 |
| 7,755,213 B2 * | 7/2010 | Ang | 307/10.1 |
| 2003/0057908 A1 | 3/2003 | Kusaka et al. | |

FOREIGN PATENT DOCUMENTS

| | | |
|---|---|---|
| EP | 0 834 977 | 4/1998 |
| EP | 1 172 926 | 1/2002 |
| JP | H10-337047 | 12/1998 |
| JP | 2000-324857 | 11/2000 |
| JP | 2001-178014 | 6/2001 |
| JP | 2003-320942 | 11/2003 |

(Continued)

OTHER PUBLICATIONS

Extended European Search Report dated Feb. 24, 2009, issued in corresponding European Application No. 08020248.4-2207.

(Continued)

*Primary Examiner*—Albert W Paladini
(74) *Attorney, Agent, or Firm*—Nixon & Vanderhye PC

(57) ABSTRACT

In a power supply system, a controller is electrically connected with a plurality of switching elements of a multiphase inverter. The controller switches the plurality of switching elements on and off during a multiphase motor being activated. This converts a voltage of a first power storage device into a multiphase AC voltage so as to supply the multiphase AC voltage to the multiphase motor. This also boosts a voltage of a second power storage device to charge the first power storage device by the boosted voltage via multiphase windings of the motor. The controller switches the plurality of switching elements on and off during the multiphase motor being inactivated to thereby boost the voltage of the second power storage device to charge the first power storage device by the boosted voltage.

22 Claims, 14 Drawing Sheets

FOREIGN PATENT DOCUMENTS

| | | |
|---|---|---|
| JP | 2004-229447 | 8/2004 |
| JP | 2006-304574 | 11/2006 |
| JP | 2007-153149 | 6/2007 |
| JP | 2007-223510 | 9/2007 |

OTHER PUBLICATIONS

Japanese Office Action dated Sep. 1, 2009, issued in corresponding Japanese Application No. 2007-303707, with English Translation.

* cited by examiner

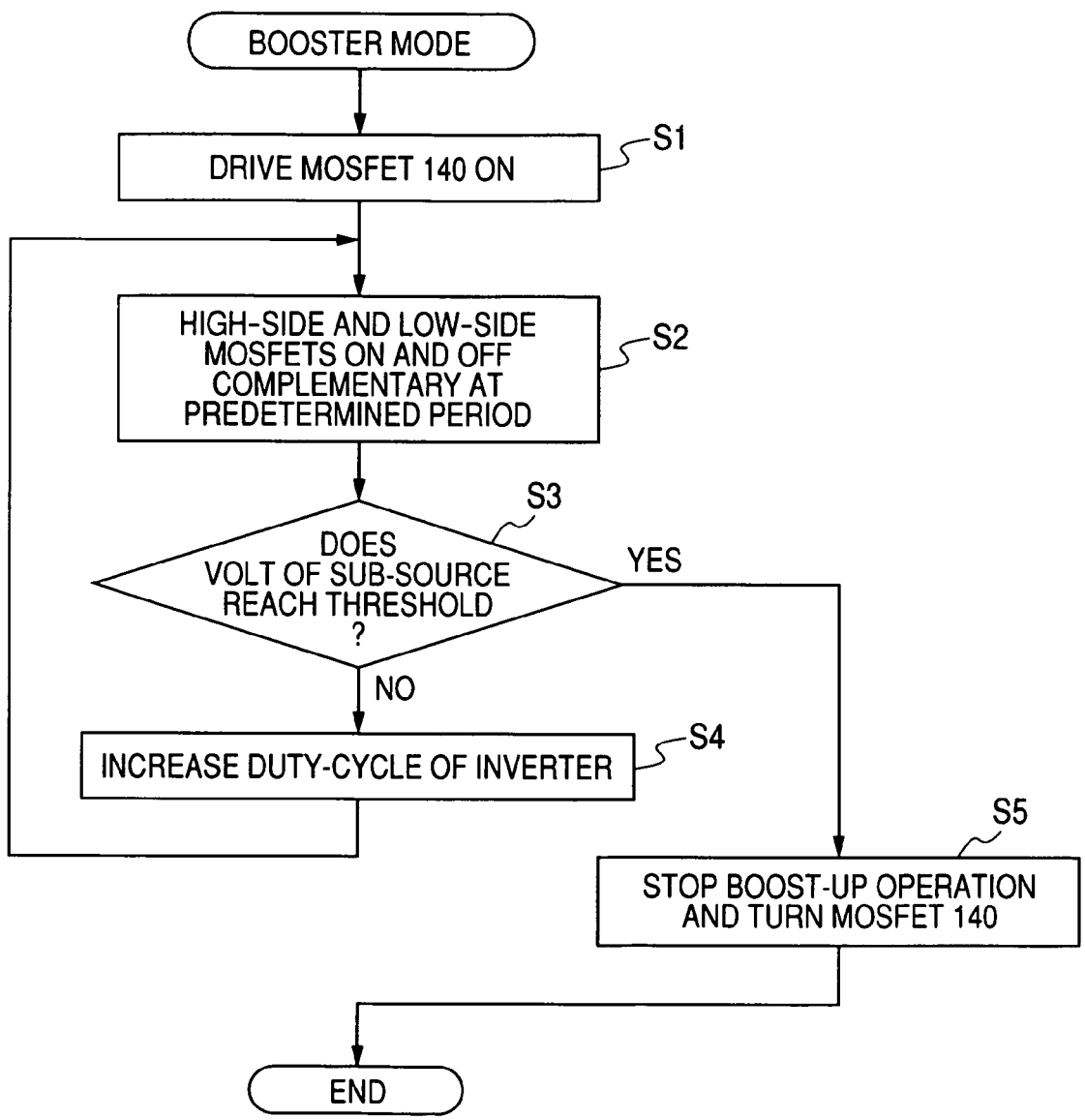

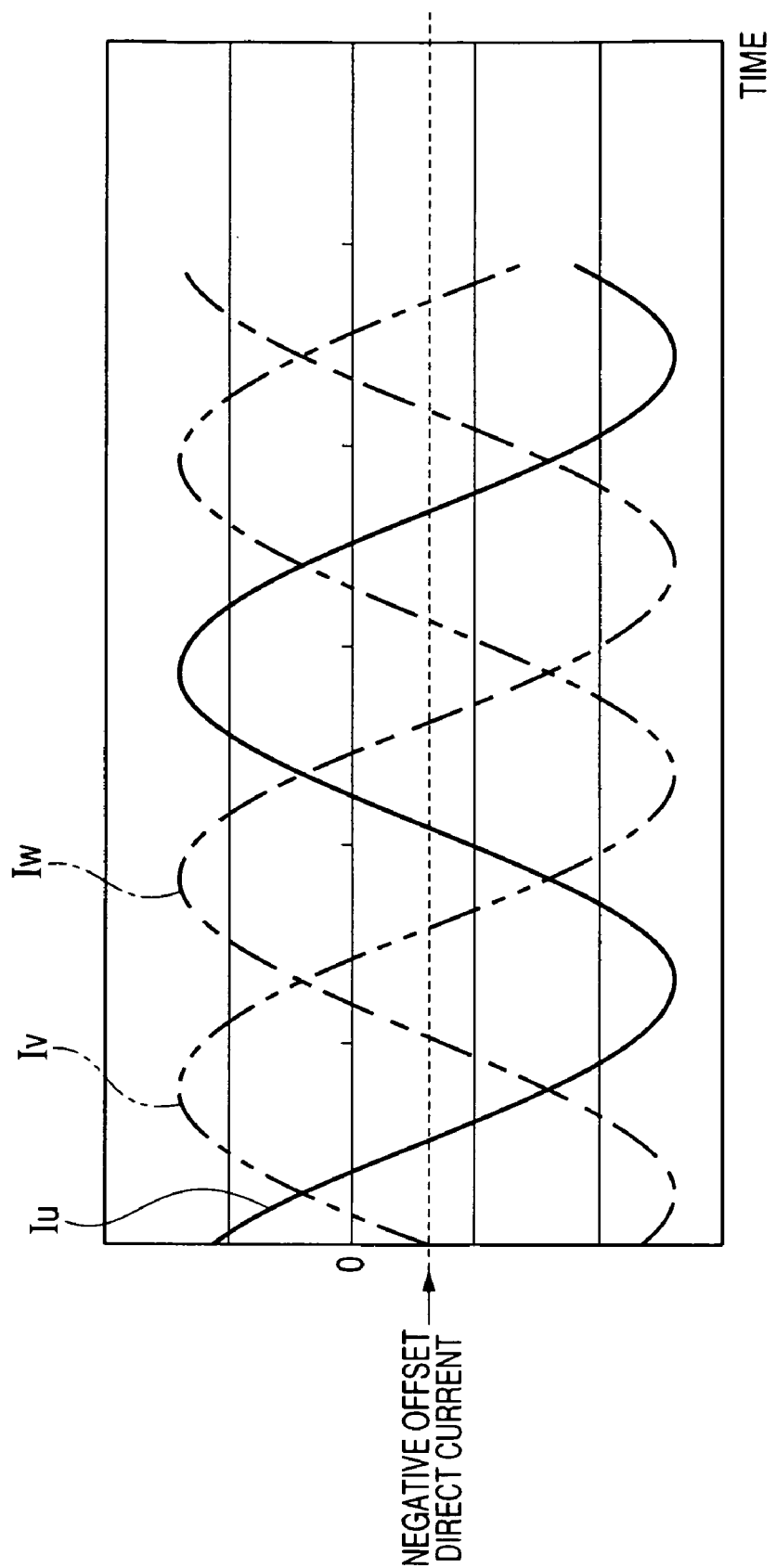

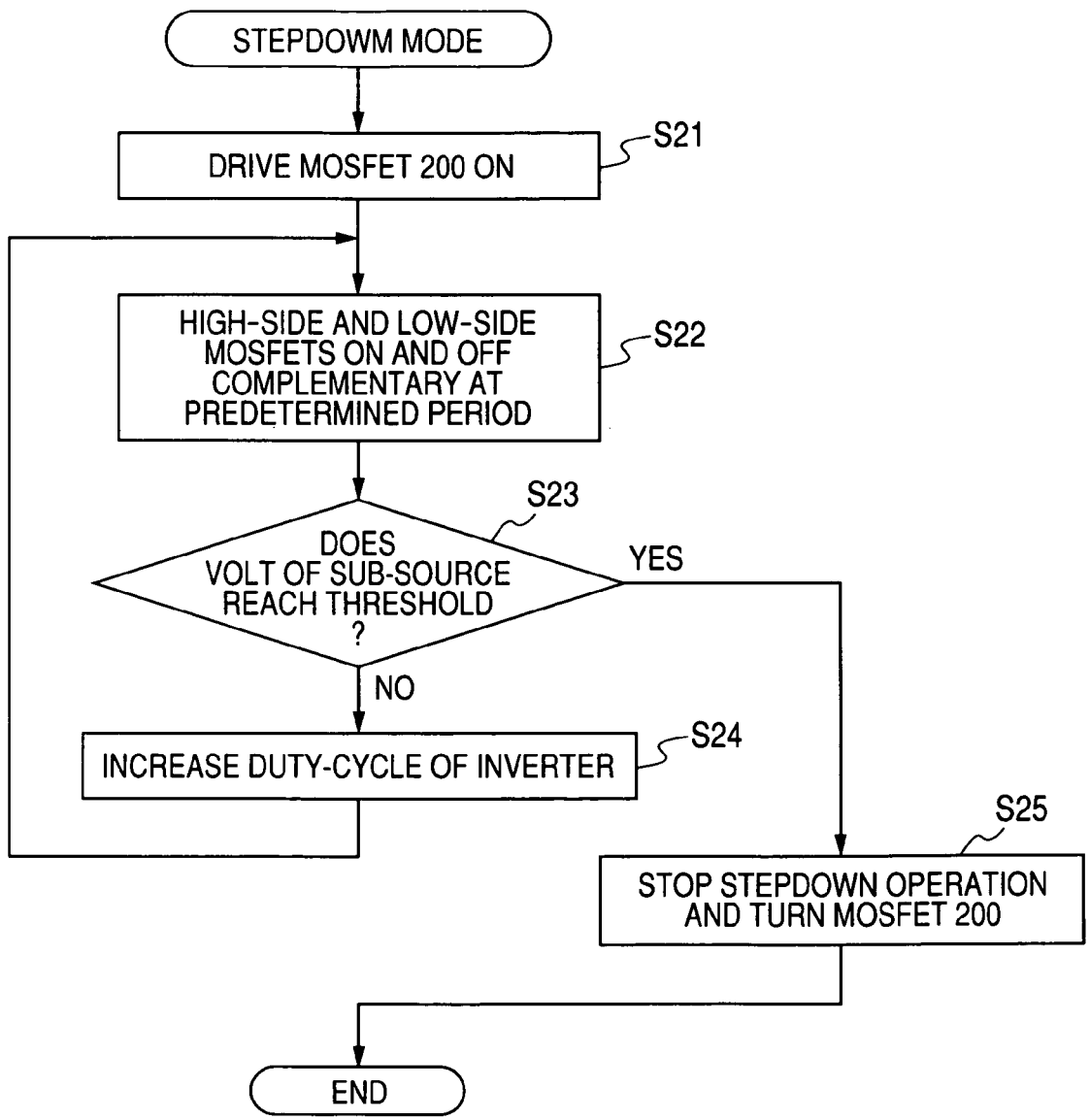

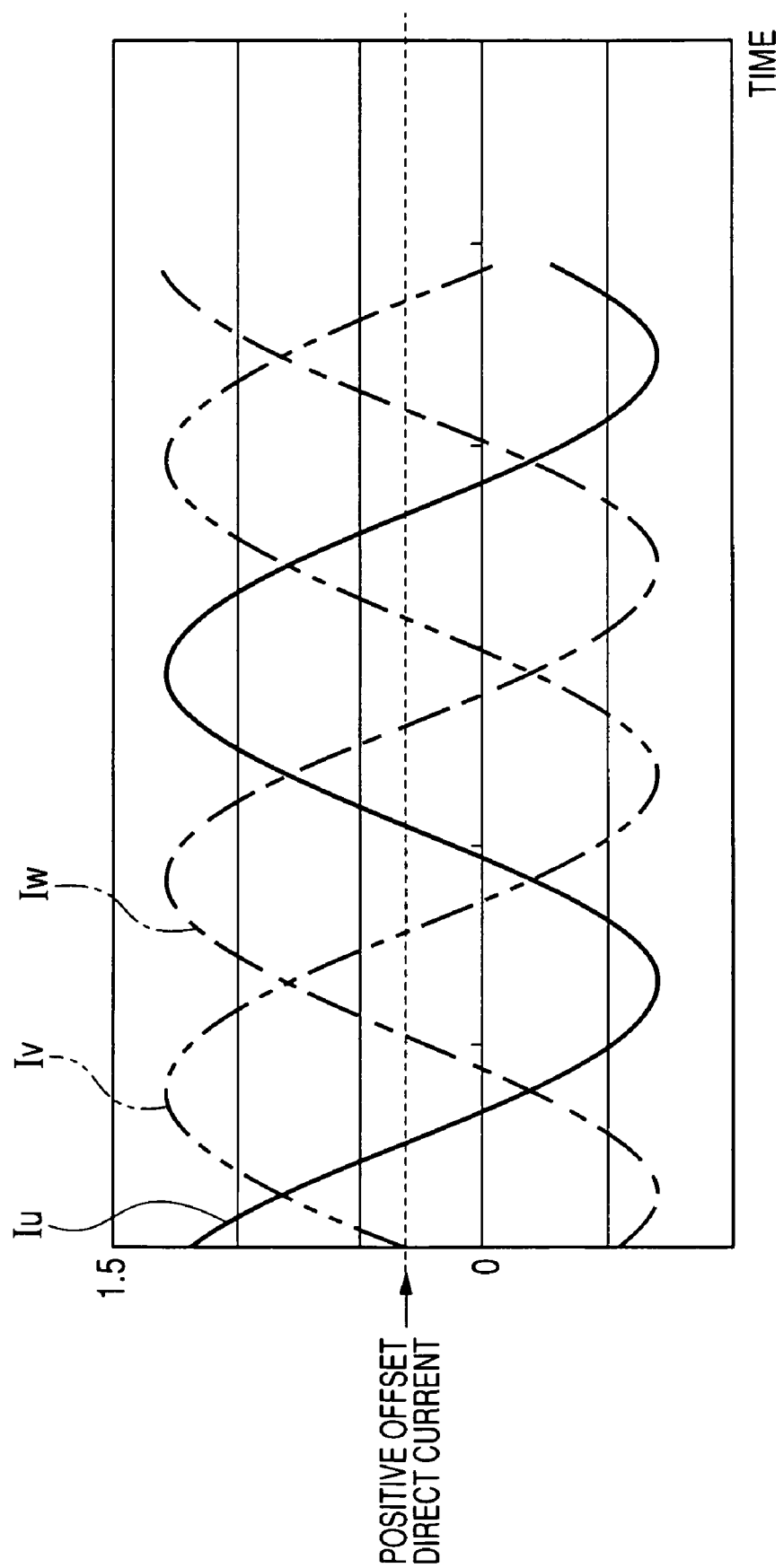

POWER SUPPLY SYSTEM WITH MULTIPHASE MOTOR AND MULTIPHASE INVERTER

CROSS REFERENCE TO RELATED APPLICATIONS

This application is based on Japanese Patent Application 2007-303707 filed on Nov. 22, 2007. The descriptions of the patent application are all incorporated herein by reference.

FIELD OF THE INVENTION

The present invention relates to power supply systems equipped with a multiphase motor and a multiphase inverter, which are capable of supplying different voltages to electric loads.

BACKGROUND OF THE INVENTION

The increasing need for various electric loads for motor vehicles has increased the need for power supply systems capable of supplying a higher voltage to some of the various electric loads, and a lower voltage to the remaining electric loads.

An example of such power supply systems is disclosed in Japanese Patent Application Publication NO. 2007-153149.

The power supply system disclosed in the patent application Publication includes a lower battery, a higher battery, a DC to DC converter, and an electronic control unit. Under control of the electronic control unit, the DC to DC converter works to boost a DC voltage of the lower battery, and supply the boosted voltage to the higher battery. Under control of the electronic control unit, the DC to DC converter also works to step down a voltage of the higher battery, and supply the stepped-down voltage to the lower battery.

Because the structure of the power supply system requires a costly DC to DC converter, it is difficult to reduce the cost of the power supply system.

Thus, in order to achieve such a different-voltage supplying function without using DC to DC converters, U.S. Pat. No. 6,320,775 corresponding to Japanese Patent Application Publication NO. H10-337047 discloses a power converter system.

The power converter system disclosed in the U.S. Patent includes a DC battery serving as a lower battery, a smoothing capacitor serving as a higher battery, a three-phase inverter, and a three-phase induction motor; these inverter and induction motor serve as loads of the smoothing capacitor. The power converter system is designed to provide the different-voltage supplying function with the use of the three-phase inverter and three-phase induction motor as the loads of the smoothing capacitor.

Specifically, a high DC-voltage terminal and a low DC-voltage terminal of the three-phase inverter are connected to one electrode and the other electrode of the smoothing capacitor, respectively. Any one of the high DC-voltage terminal and the low DC-voltage terminal of the three-phase inverter is connected to one of high-side and low-side electrodes of the DC battery. One end of each phase winding of the three-phase induction motor is connected to a corresponding AC terminal of the three-phase inverter. A neutral point of the three-phase windings is connected to the other of the high-side and low-side electrodes of the DC battery.

The three-phase inverter works to convert a DC voltage across the smoothing capacitor into a three-phase AC voltage, and supply the three-phase AC voltage to the three-phase induction motor so as to activate the three-phase induction motor.

During the three-phase induction motor being activated, the three-phase inverter works to:

boost a DC voltage of the DC battery so as to supply the boosted DC voltage to the smoothing capacitor; or step down the DC voltage across the smoothing capacitor so as to supply the stepped-down DC voltage to the DC battery.

The power converter system disclosed in the U.S. Patent is designed to boost a DC voltage of the DC battery so as to supply the boosted DC voltage to the smoothing capacitor or step down the DC voltage across the smoothing capacitor so as to supply the stepped-down DC voltage to the DC battery only when the three-phase induction motor is activated.

For this reason, during the three-phase induction motor being inactivated, if power is consumed by another load, it may be difficult for the power converter system to compensate the consumed power. In such a situation, activation of the three-phase induction motor may cause a rush current to be created immediately after the activation based on the DC voltage across the smoothing capacitor, resulting in significantly reducing the DC voltage across the smoothing capacitor. This may make it difficult to stably supply the different DC voltages to the electric loads.

SUMMARY OF THE INVENTION

In view of the circumstances set force above, an object of an aspect of the present invention is to provide power supply systems each with an improved structure that stably supplies different voltages to electric loads without using DC to DC converters.

The inventors of the present application has earnestly studied a solution to achieve the object. After much trial and error, the inventors have conceived the idea of using a multiphase inverter and a multiphase motor as elements of a booster (step-up converter) and a step-down converter during the multiphase motor being inactivated to thereby complete the present invention.

Thus, according to one aspect of the present invention, there is provided a power supply system including a chargeable and dischargeable first power storage device having one potential terminal, an other potential terminal, and a first chargeable voltage range. The power supply system includes a chargeable and dischargeable second power storage device having one potential terminal, an other potential terminal, and a second chargeable voltage range lower than the first chargeable voltage range. The power supply system includes a multiphase motor having a star-connected multiphase stator windings with a neutral point. The multiphase motor works to generate torque when the star-connected multiphase stator windings are energized. The neutral point is electrically connected with the one potential terminal of the second power storage device. The power supply system includes a multiphase inverter including a plurality of switching elements connected with each other in bridge configuration to provide a high-side direct-current (DC) terminal and a low-side direct-current (DC) terminal. The high-side DC terminal is electrically connected with the one potential terminal of the first power storage device. The low-side DC terminal is electrically connected with the other potential terminal of the first power storage device. Any one of the high-side and low-side DC terminals is electrically connected with the other potential terminal of the second power storage device. The power supply system includes a controller electrically connected with the plurality of switching elements. The controller works to switch the plurality of switching elements on and off dug the multiphase motor being activated to thereby:

convert a voltage of the first power storage device into a multiphase alternating-current (AC) voltage so as to supply the multiphase AC voltage to the multiphase motor; and boost the voltage of the second power storage device to charge the first power storage device by the boosted voltage. The controller works to switch the plurality of switching elements on and off during the multiphase motor being inactivated to thereby boost the voltage of the second power storage device to charge the first power storage device by the boosted voltage.

According to another aspect of the present invention, there is provided a power supply system. The power supply system includes a chargeable and dischargeable first power storage device having one potential terminal, an other potential terminal, and a first chargeable voltage range, and a chargeable and dischargeable second power storage device having one potential terminal, an other potential terminal, and a second chargeable voltage range lower than the first chargeable voltage range. The power supply system includes a multiphase motor having a star-connected multiphase stator windings with a neutral point. The multiphase motor works to generate torque when the star-connected multiphase stator windings are energized. The neutral point is electrically connected with the one potential terminal of the second power storage device. The power supply system includes a multiphase inverter including a plurality of switching elements connected with each other in bridge configuration to provide a high-side direct-current (DC) terminal and a low-side direct-current (DC) terminal. The high-side DC terminal is electrically connected with the one potential terminal of the first power storage device. The low-side DC terminal is electrically connected with the other potential terminal of the first power storage device. Any one of the high-side and low-side DC terminals is electrically connected with the other potential terminal of the second power storage device. The power supply system includes a controller electrically connected with the plurality of switching elements. The controller works to switch the plurality of switching elements on and off during the multiphase motor being activated to thereby:

convert a voltage of the first power storage device into a multiphase alternating-current (AC) voltage so as to supply the multiphase AC voltage to the multiphase motor; and step down the voltage of the first power storage device to charge the second power storage device by the stepped-down voltage. The controller works to switch the plurality of switching elements on and off during the multiphase motor being inactivated to thereby step down the voltage of the first power storage device to charge the second power storage device by the stepped-down voltage.

BRIEF DESCRIPTION OF THE DRAWINGS

Other objects and aspects of the invention will become apparent from the following description of embodiments with reference to the accompanying drawings in which:

FIG. 1B is a flowchart schematically illustrating operations of a controller illustrated in FIG. 1A in a booster mode according to the first embodiment;

FIG. 1C is a graph schematically illustrating waveforms of three-phase alternating currents and a zero-phase current according to the first embodiment;

FIG. 2B is a flowchart schematically illustrating operations of a controller illustrated in FIG. 2A in a step-down converter mode according to the second embodiment;

FIG. 2C is a graph schematically illustrating waveforms of three-phase alternating currents and a zero-phase current according to the second embodiment;

DETAILED DESCRIPTION OF EMBODIMENTS OF THE INVENTION

Embodiments of the present invention will be described hereinafter with reference to the accompanying drawings.

First Embodiment

Figure 1A:
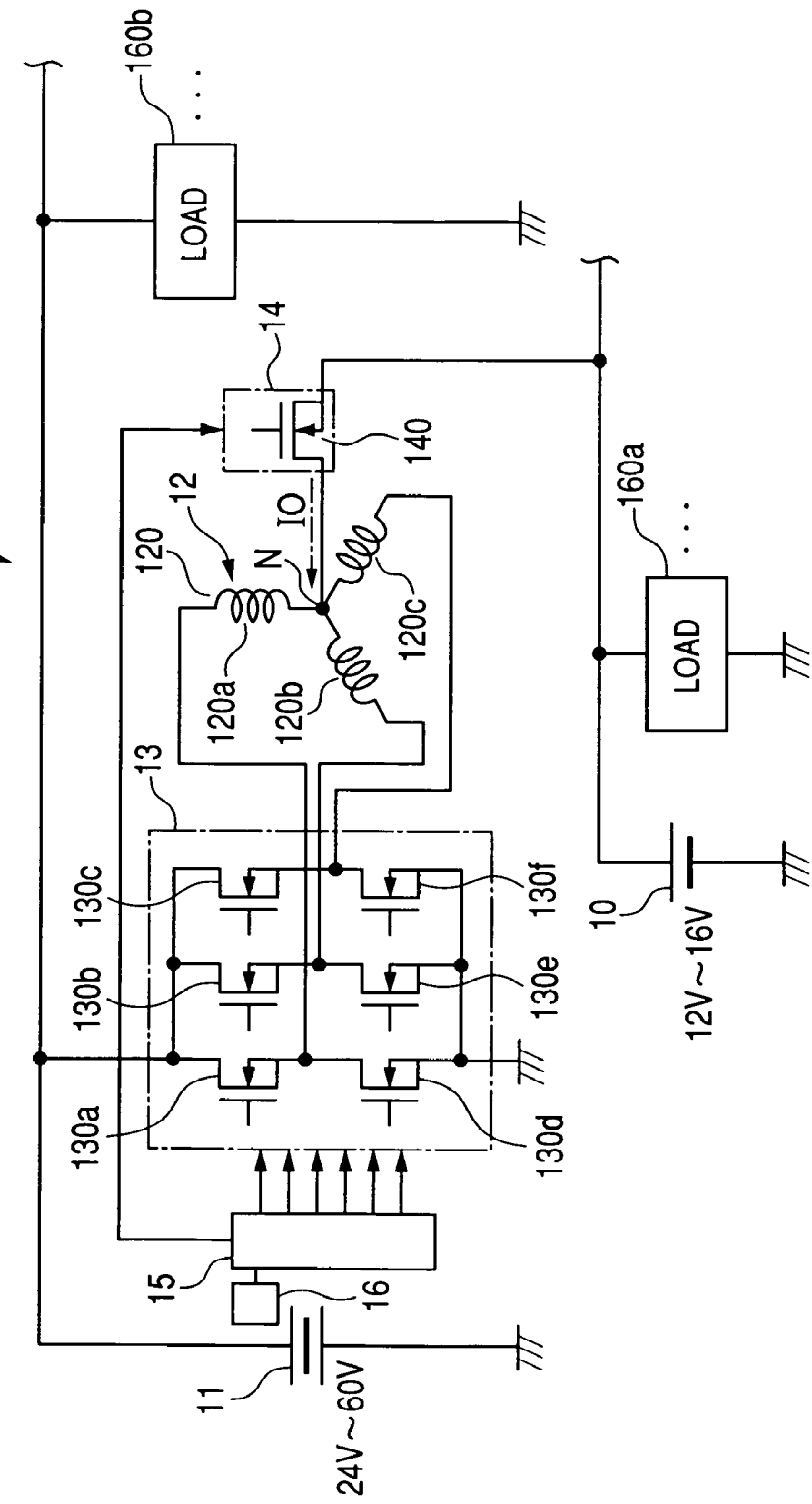
FIG. 1A is a circuit diagram schematically illustrating an example of the structure of a power supply system according to a first embodiment of the present invention.

Referring to FIG. 1A, there is provided a power supply system 1 installed in a motor vehicle according to a first embodiment of the present invention.

The power supply system 1 includes a main power source (second power storage device) 10, a sub power source (first power storage device) 11, a three-phase brushless motor 12, a tee-phase inverter 13, a switching circuit 14, a controller 15, and a voltage sensor 16.

The main power source 10 consists of, for example, a battery chargeable and dischargeable within a DC voltage range from 12 volts (V) to 16 volts (V). The main power source 10 has positive and negative electrodes (one and an other potential terminals), the positive electrode of which is electrically connected to electric loads 160a that operate at a voltage within a DC voltage range from 12 V to 16V. The negative electrode of the main power source 10 is electrically connected to a body of the motor vehicle to be grounded.

The sub power source 11 consists of, for example, a capacitor chargeable and dischargeable within a DC voltage range from 24 V to 60 V. The sub power source 11 has positive and negative electrodes (one and an other potential terminals), the positive electrode of which is electrically connected to electric loads 160b that operate at a voltage within a range from 24 V to 60 V. The negative electrode of the sub power source 11 is electrically connected to the body of the motor vehicle to be grounded.

The three-phase brushless motor 12 is configured to generate torque based on a three-phase alternating-current (AC) voltage according to a rotation angle of a rotor (not shown); this three-phase AC voltage is supplied from the three-phase inverter 13. For example, the three-phase brushless motor 12 is used as a drive motor operable in a DC voltage range from 24 V to 60 V, such as a drive motor for an electric power steering system. The electric power steering system is operative to assist the driver's operation of a steering wheel of the motor vehicle based on torque created by the drive motor.

Specifically, the three-phase brushless motor 12 is equipped with a magnetized rotor with a plurality of alternative north and south poles. The three-phase brushless motor 12 is also equipped with a stator 120 with a stator core and a stator coil. The stator core is disposed around, for example, the outer circumference of the rotor such that the inner circumference of the stator core is opposite to the outer circumference of the rotor with a predetermined gap.

The stator coil consists of a U-phase stator winding 120a, a V-phase stator winding 120b, and a W-phase stator winding 120c. The three-phase stator windings 120a, 120b, and 120c are wound in slots formed in the stator core such that the U-, V-, and W-phase stator windings 120a, 120b, and 120c are shifted by, for example, 120 electric degrees ($2\pi/3$ radian) in phase from each other. One ends of the U-, V-, and W-phase stator windings 120a, 120b, and 120c are connected to each other in star configuration to constitute a neutral point N.

The neutral point N of the three-phase stator windings 120a, 120b, and 120c is electrically connected to the positive electrode of the main power source via the switching circuit 14.

Under control of the controller 15, the three-phase inverter 13 works to convert a direct-current (DC) voltage of the sub power source 11 into a three-phase AC voltage to thereby supply the three-phase AC voltage to the three-phase brushless motor 12. Under control of the controller 15, the three-phase inverter 13 serves as a step-up converter for boosting the voltage of the main power source 10 so as to supply the boosted voltage to the sub power source 11 to thereby charge it. Under control of the controller 15, the three-phase inverter 13 also serves as a step-down converter for stepping down the voltage of the sub power source 11 so as to supply the stepped-down voltage to the main power source 10 to thereby charge it.

Specifically, the three-phase inverter 13 is composed of a first pair (bridge arm) of series-connected hi-side and low-side switching elements 130a and 130d, a second pair of series-connected high-side and low-side switching elements 130b and 130e, and a third pair of series-connected high-side and low-side switching elements 130c and 130c. The three-phase inverter 13 is also composed of flywheel diodes (not shown) connected in antiparallel with the switching elements 130a, 130b, 130c, 130d, 130e, and 130f, respectively.

As the switching elements 130a, 130b, 130c, 130d, 130e, and 130f, IGBTs (Insulated Gate Bipolar Transistors) or power MOSFETs can be used. When the power MOSFETs are used as the switching elements, the intrinsic diodes of the power MOSFETs can be used instead of the flywheel diodes. In the first embodiment, as the switching elements, MOSFETs are used.

The first to third bridge arms of MOSFETs 130a to 130e are parallely connected with each other in bridge configuration.

The drains of the respective high-side MOSFETs 130a, 130b, and 130c are commonly connected with each other to constitute a high-side DC terminal of the three-phase inverter 13, and the high-side DC terminal of the three-phase inverter 13 is electrically connected with the positive electrode of the sub power source 11. The sources of the respective low-side MOSFETs 130d, 130c, and 130f are commonly connected with each other to constitute a low-side DC terminal of the three-phase inverter 13, and the low-side DC terminal of the three-phase inverter 13 is grounded so as to be electrically connected to the negative electrode of the sub power source 11.

A series connection point between the high-side and low-side MOSFETs 130a and 130d of the first pair constitutes an AC terminal to be electrically connected with an output lead extending from the other end (output end) of the U-phase winding 120a. Similarly, a series connection point between the high-side and low-side MOSFETs 130b and 130e of the second pair constitutes an AC terminal to be electrically connected with an output lead extending from the other end (output end) of the V-phase winding 120b. Moreover, a series connection point between the high-side and low-side MOSFETs 130c and 130f of the third pair constitutes an AC terminal to be electrically connected with an output lead extending from the other end (output end) of the W-phase winding 120c.

The switching circuit 14 is provided between the neutral point N of the stator coil of the stator 120 and the main power source 10 and is controllably connected with the controller 15. For example, the switching circuit 14 consists of a MOSFET 140. The drain of the MOSFET 140 is electrically connected with the neutral point N of the stator coil of the stator 120, the source of the MOSFET 140 is electrically connected with the positive electrode of the main power source 10, and the gate of the MOSFET 140 is electrically connected with the controller 15.

Under control of the controller 15, the MOSFET 140 works to be turned on or off to thereby electrically connect or disconnect between the neutral point N of the stator coil of the stator 120 and the main power source 10.

The controller 15 is designed to control the three-phase inverter 13 together with the switching circuit 14. Specifically, the controller 15 is electrically connected with the gate of each of the high-side MOSFETs 130a to 130c and that of each of the low-side MOSFETs 130d to 130f.

The voltage sensor 16 is electrically connected with the controller 15. The voltage sensor 16 works to continuously or periodically measure the voltage of the sub power source 11, and to output a measured voltage to the controller 15.

Operations of the power supply system 1 will be described hereinafter.

(1) Operations in Motor being Inactivated

When the three-phase brushless motor 12 is inactivated, the controller 15 operates in a booster mode to drive the MOSFET 140 of the switching circuit 14 on in step S1 of FIG. 1B. This electrically connects the neutral point N of the stator coil of the stator 120 with the main power source 10.

In the booster mode, the controller 15 works to control the three-phase inverter 13 as a booster circuit.

Specifically, in the booster mode, the controller 15 works to drive and maintain all of the high-side MOSFETs 130a, 130b, and 130c and all of the low-side MOSFETs 130d, 130e, and 130f on and off complementary at a predetermined period in step S2.

At the period when the low-side MOSFETs 130d, 130e, and 130f are on and the high-side MOSFETs 130a, 130b, and 130c are off, a direct current flows from the main power source 10 through the neutral point N, the U-, V-, and W-phase windings 120a, 120b, and 120c, and the low-side MOSFETs 130d, 130e, and 130f.

For example, in the U-phase minding 120a, when the low-side MOSFET 130d of the first bridge an is in on state while the high-side MOSFET 130a is in off state, the voltage of the main power source 10 causes a direct current to flow through the neutral point N, the U-phase winding 120a, and the low-side MOSFET 130d. This charges electromagnetic energy in the stator core.

Similarly, in each of the V- and W-phase windings 120b and 120c, the voltage of the main power source 10 causes a direct current to flow through the neutral point N, a corresponding phase winding, and a corresponding low-side MOSFET, thus charging electromagnetic energy in the stator core.

At the period when the low-side MOSFETs 130d, 130e, and 130f are off and the high-side MOSFETs 130a, 130b, and 130c are on, in the first bridge arm, the sum of a voltage generated by the electromagnetic energy charged in the stator core by the U-phase winding 120a and the voltage of the main power source 10 is applied to the high-side DC terminal of the three-phase inverter 13.

Similarly, in each of the second and third bridge arms, the sum of a voltage generated by the electromagnetic energy charged in the stator core by a corresponding phase winding and the voltage of the main power source 10 is applied to the high-side DC terminal of the three-phase inverter 13.

Specifically, the potential of the high-side DC terminal of the three-phase inverter 13 is boosted by the sum of the voltage generated by the electromagnetic energy charged in the stator core and the voltage of the main power source 10. The boosted potential of the high-side DC terminal of the three-phase inverter 13 charges the sub power source 11 so that the voltage of the sub power source 11 lies within the DC voltage range from 24 V to 60 V; this DC voltage range from 24 V to 60 V is equal to or more than twice the DC voltage range of the main power source 10 from 12 V to 16 V. The boost ratio of the power supply system 1 can be controlled by adjusting a duty cycle of each of the low-side MOSFETs 130d, 130e, and 130f and that of each of the high-side MOSFETs 130a, 130b, and 130c in order to increase the direct current through the windings 120a, 120b, and 120c.

This allows a sufficient voltage to be ensured in the sub power source 11 to thereby reliably drive the three-phase brushless motor 12 and the electric loads 160b.

During the controller 1S executing the operations in steps S1 and S2, the controller 15 parallely determines, based on a measured voltage by the voltage sensor 16, whether the voltage of the sub power source 11 reaches a predetermined threshold, such as an upper limit of the DC voltage range from 24 V to 60 V in step S3.

Alternatively, in step S3, the controller 15 parallely determines, based on a measured voltage by the voltage sensor 16, whether the voltage of the sub power source 11 is equal to or greater than the predetermined threshold.

Upon determining that the voltage of the sub power source 11 is less than the predetermined threshold (NO in step S3), the controller 15 increases the duty cycle of the three-phase inverter 13 in step S4, and continues the operations in steps S2 and S3.

Otherwise, upon determining that the voltage of the sub power source 11 reaches the predetermined threshold (YES in step S3), the controller 15 stops the operation in the booster mode, and turns the MOSFET 140 off in step S5.

This achieves an effect of preventing excessive boosting of the voltage of the main power source 10 to thereby effectively stabilize the voltage of the sub power source 11. In addition, although the charging of the sub power source 11 is stopped, because a sufficient voltage is ensured in the sub power source 11, there is little influence on the electric loads 160b being activated.

When the boosted level of the voltage of the main power source 10 is insufficient, an increase of the direct current allows the boosted level of the voltage of the main power source 10 to increase.

(2) Operations in Motor being Activated

When the three-phase brushless motor 12 is activated, the controller 15 operates in a motor-drive and booster mode to drive the MOSFET 140 of the switching circuit 14 on. This electrically connects the neutral point N of the stator coil of the stator 120 with the main power source 10.

In the motor-drive and booster mode, during at least some periods, the controller 15 works to operate in the motor-drive mode to individually drive each of the MOSFETs 130a, 130b, 130c, 130d, 130e, and 130f based on a corresponding one drive pulse with a predetermined duty cycle for causing U-, V-, and W-phase alternating currents Iu, Iv, and Iw having the waveforms illustrated in FIG. 1C to flow through the respective windings 120a, 120b, and 120c. This allows the three-phase inverter 13 to chop the voltage (DC voltage) of the sub power source 11 to thereby generate U-, V-, and W-phase command voltages. The U-, V-, and W-phase command voltages are supplied to the respective U-, V-, and W-phase windings 120a, 120b, and 120c of the three-phase brushless motor 12 to thereby cause the three-phase alternating currents Iu, Iv, and Iw to flow through the respective three-phase windings 120a, 120b, and 120c. This creates torque to rotate the rotor.

A negative offset DC component illustrated in FIG. 1C boosts up the voltage of the main power source 10 in the same manner as the operations illustrated in FIG. 1B so as to charge the sub power source 17.

The negative offset current will be referred to as "zero-phase current I0".

Specifically, the zero-phase current I0 to flow from the main power source 10 toward the U-, V-, and W-phase windings 120a, 120b, and 120c via the neutral point N thereof (see FIG. 1). The zero-phase current I0 is divided to flow through the U-, V-, and W-phase coils 120a, 120b, and 120c, and the low-side MOSFETs 130d, 130e, and 130f.

For example, in the U-phase winding 120a, when the low-side MOSFET 130d of the first bridge arm is in on state while the high-side MOSFET 130a is in off state, the voltage of the main power source 10 causes a current component of the zero-phase current I0 to flow through the U-phase winding 120a and the low-side MOSFET 130d. This charges electromagnetic energy in the stator core.

At a next period, in the first bridge arm, when the low-side MOSFET 130d is turned off and the high-side MOSFET 130a is turned on, the sum of a voltage generated by the electromagnetic energy charged in the stator core by the U-phase winding 120*a* and the voltage of the main power source 10 is applied to the high-side DC terminal of the tree-phase inverter 13.

Similarly, in each of the second and third bridge arms, the sum of a voltage generated by the electromagnetic energy charged in the stator core by a corresponding phase winding and the voltage of the main power source 10 is applied to the high-side DC terminal of the three-phase inverter 13.

Specifically, the potential of the high-side DC terminal of the three-phase inverter 13 is boosted by the sum of the voltage generated by the electromagnetic energy charged in the stator core and the voltage of the main power source 10. The boosted potential of the high-side DC terminal of the three-phase inverter 13 charges the sub power source 11 so that the voltage of the sub power source 11 lies within the DC voltage range from 24 V to 60 V is equal to or more than twice the DC voltage range of the main power source 10 from 12 V to 16 V.

Because the U-, V-, W-phase currents (three-phase alternating currents) are expressed by respective Iu, Iv, and Iw, the following equation is established;

$$Iu+Iv+Iw+I0=0$$

This equation provides the relationship between the zero-phase current I0 and the U-, V-, W-phase currents Iu, Iv, and Iw, this relationship is represented by the following equation;

$$I_0=-(Iu+Iv+Iw)$$

When the zero-phase current $I_0$ is uniformly distributed into the U-, V-, W-phase currents Iu, Iv, and Iw, an average value of an amplitude of each of the U-, V-, W-phase currents Iu, Iv, and Iw is DC offset by $-I_0/3$.

Electromagnetic energy to be created by the offset current $-I_0/3$ achieves the effect of boosting the voltage of the main power source 10 to be applied to the three-phase inverters 13. For this reason, the boost ratio of the power supply system 1 can be controlled by adjusting the offset current $-I_0/3$ in addition to a duty cycle of each of the low-side MOSFETs 130*d*, 130*e*, and 130*f* and that of each of the high-side MOSFETs 130*a*, 130S, and 130*c*.

This allows a sufficient voltage to be ensured in the sub power source 11 to thereby reliably drive the three-phase brushless motor 12 and the electric loads 160*b*. Preferably, the voltage charged in the sub power source 11 in the booster mode is greater than that charged in the sub power source 11 in the motor-drive and booster mode.

During the controller 15 executing the aforementioned operations, the controller 15 parallely determines, based on a measured voltage by the voltage sensor 16, whether the voltage of the sub power source 11 reaches (or is not less than) a predetermined threshold, such as an upper limit of the DC voltage range from 24 V to 60 V.

Alternatively, the controller 15 parallely determines, based on a measured voltage by the voltage sensor 16, whether the voltage of the sub power source 11 is equal to or greater than the predetermined threshold.

Upon determining that the voltage of the sub power source 11 is less than the predetermined threshold, the controller 15 continues the aforementioned operations.

This achieves an effect of preventing excessive boosting of the voltage of the sub power source 11 to thereby effectively stabilize the voltage of the sub power source 11. In addition, although the charging of the sub power source 11 is stopped, because a sufficient voltage is ensured in the sub power source 11, there is little influence on the three-phase brushless motor 12 and the electric loads 160*b* being activated.

Note that, immediately after the activation of the three-phase brushless motor 12, a large rush current may flow through the stator coil of the stator 120 through the capacitor of the sub power source 11 when the boosting is not carried out during the three-phase brushless motor 12 being inactivated.

However, the power supply system 1 according to the first embodiment is configured to sufficiently charge the sub power source 11 during the three-phase brushless motor 12 being inactivated. Thus, it is possible to prevent a large rush current from flowing through the stator coil of the stator 120 even immediately after the activation of the three-phase brushless motor 12.

When the boosted level of the voltage of the main power source 10 is insufficient during the motor 12 being inactivated, an increase of the dc current allows the boosted level of the voltage of the main power source 10 to increase. When the boosted level of the voltage of the main power source 10 is insufficient during the motor 12 being activated, a negative increase of the zero-phase current I0 allows the boosted level of the voltage of the main power source 10 to increase.

As described above, the power supply system 1 has a simple structure without using DC to DC converters that supplies a voltage within the lower range from 12 V to 16 V to the electric loads 160*a* and that within the higher range from 24 V to 60 V to the electric loads 160*b*.

In addition, the power supply system 1 is designed to, during the three-phase brushless motor 12 being inactivated, use the three-phase inverter 13 and the stator coil of the stator 120 to thereby boost the voltage of the main power source 10 and to charge the sub power source 11 by the boosted voltage.

This allows, even if power is consumed by the electric loads 160*b* during the three-phase brushless motor 12 being inactivated, the voltage of the sub power source 11 to be reliably secured at a sufficient level. Thus, it is possible to reduce the fluctuation in the voltage of the sub power source 11.

The power supply system 1 is also configured to, even if the motor 12 is activated, stop the operation in the booster mode, and turn the MOSFET 140 off while continuing the operation in the motor-drive mode when it is determined that the voltage of the sub power source 11 reaches the predetermined threshold. This makes it possible to prevent excessive boosting of the voltage of the main power source 10, thus effectively stabilizing the voltage of the sub power source 11.

The power supply system 1 is further configured to step up the voltage of the main power source 10 so that the stepped-up voltage lies within the higher voltage range that is equal to or more than twice the lower voltage range of 12 V to 16 V. This increases a DC voltage range that the sub power source 11 can supply, increasing the versatility of the power supply system 1.

In addition, the power supply system 1 is configured to connect the main power source 10 to the neutral point N of the stator coil of the stator 120 only when boosting the voltage of the main power source 10. This prevents, even if there is a potential difference between the neutral point N and the main power source 10, a leakage current from being created based on the potential difference between the neutral point N and the main power source 10 when the voltage of the main power source 10 is not boosted.

In the power supply system 1 according to the first embodiment, because the capacitor constitutes the sub power source 11, it is possible to charge and discharge the voltage of the sub power source 11 at a high speed as compared with another voltage-chargeable/dischargeable component constituting the sub power source 11. Moreover, it is possible to reduce the cost of the sub power source 11 as compared with another voltage-chargeable/dischargeable component.

Second Embodiment

A power supply system 2 according to a second embodiment of the present invention will be described hereinafter.

The power supply system 2 according to the second embodiment is designed to change a sub power source by stepping down a voltage of a main power source.

Figure 2A:
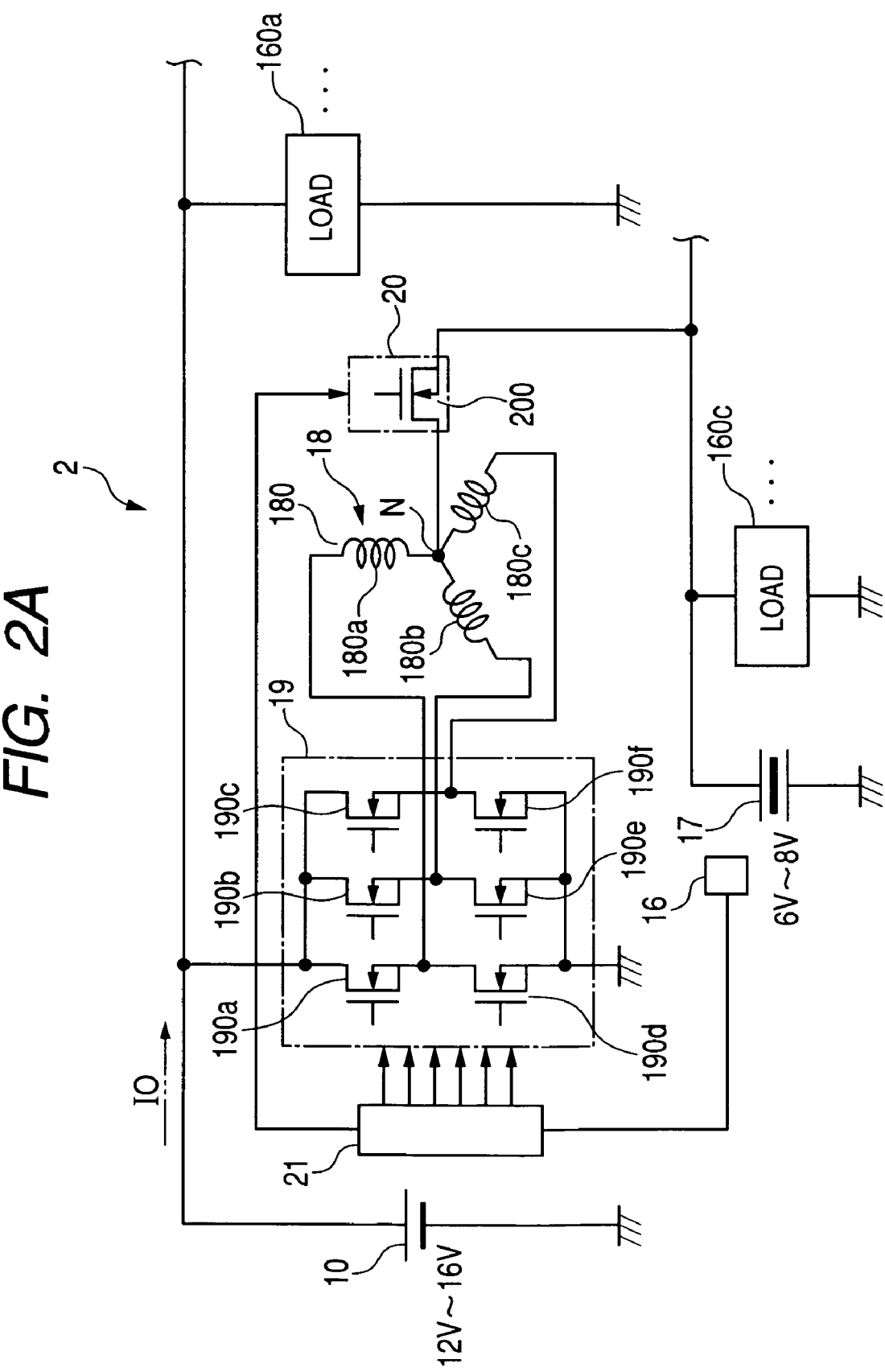
FIG. 2A is a circuit diagram schematically illustrating an example of the structure of a power supply system according to a second embodiment of the present invention.

FIG. 2A schematically illustrates an example of the structure of the power supply system 2 according to the second embodiment. Like parts between the power supply systems 1 and 2 according to the first and second embodiments, to which like reference characters are assigned, are omitted or simplified in description.

The power supply system 2 includes a main power source 10, a sub power source (second power storage device) 17, a three-phase brushless motor 18, a three-phase inverter 19, a switching circuit 20, a controller 21, and a voltage sensor 16.

The main power source 10 consists of, for example, a battery chargeable and dischargeable within a DC voltage range from 12 V to 16 V. Like the first embodiment, the positive electrode of the main power source 10 is electrically connected to electric loads 160*a* that operate at a voltage within a DC voltage range from 12 V to 16V. The negative electrode of the main power source 10 is electrically connected to the body of the motor vehicle to be grounded.

The sub power source L7 consists of, for example, a capacitor chargeable and dischargeable within a DC voltage range from 6 V to 8 V. The sub power source 17 has positive and negative electrodes (high-side and low-side terminals), the positive electrode of which is electrically connected to electric loads 160*c* that operate at a voltage within a DC voltage range from 6 V to 8 V. The negative electrode of the sub power source 17 is electrically connected to the body of the motor vehicle to be grounded.

The three-phase brushless motor 18 is configured to generate torque based on a three-phase AC voltage according to a rotation angle of a rotor (not shown); this three-phase AC voltage is supplied from the tree-phase inverter 13. For example, the three-phase brushless motor 18 is used as a drive motor operable in a DC voltage range from 12 V to 16 V, such as a drive motor for a starter system, an electric stabilizer system, an air-conditioning system, or the like. The starter system is operative to cause the engine crankshaft to begin to turn based on torque created by the drive motor to thereby star the engine running. The stabilizer system is operative to keep the quality or state of the motor vehicle controllable based on torque created by the drive motor. For example, the stabilizer system is operative to keep the passenger compartment of the motor vehicle from swaying and lurching on sharp curves and turns. The air-conditioning system is operative to drive a compressor based on torque created by the drive motor to thereby control the temperature and/or humidity within the cab of the motor vehicle.

Specifically, the three-phase brushless motor 18 is equipped with a magnetized rotor with a plurality of alternative north and south poles. The three-phase brushless motor 18 is also equipped with a stator 120 with a stator core and a stator coil. The stator core is disposed around, for example, the outer circumference of the rotor such that the inner circumference of the stator core is opposite to the outer circumference of the rotor with a predetermined gap.

The stator coil consists of a U-phase stator winding 180*a*, a V-phase stator winding 180*b*, and a W-phase stator winding 180*c*. The three-phase stator windings 180*a*, 180*b*, and 180*c* are wound in slots formed in the stator core such that the U-, V-, and W-phase stator windings 180*a*, 180*b*, and 180*c* are shifted by, for example, 120 electric degrees (2π/3 radian) in phase from each other. One ends of the U-, V-, and W-phase stator windings 180*a*, 110*b*, and 180*c* are connected to each other in star configuration to constitute a neutral point N.

The neutral point N of the three-phase stator windings 130*a*, 180*b*, and 180*c* is electrically connected to the positive electrode of the main power source via the switching circuit 14.

The three-phase inverter 19 has a structure substantially identical to the structure of the three-phase inverter 13 except for the following matters:

The high-side and low-side MOSFETs 130*a* to 130*f* are replaced with high-side and low-side MOSFETs 190*a* to 190*f*, respectively.

The drains of the respective high-side MOSFETs 190*a*, 190*b*, and 190*c* are commonly connected with each other to constitute a high-side DC terminal of the three-phase inverter 19, and the high-side DC terminal of the three-phase inverter 19 is electrically connected with the positive electrode of the main power source 10.

The sources of the respective low-side MOSFETs 190*d*, 190*e*, and 190*f* are commonly connected with each other to constitute a low-side DC terminal of the three-phase inverter 19, and the low-side DC terminal of the three-phase inverter 19 is grounded so as to be electrically connected to the negative electrode of the main power source 10.

Like the switching circuit 14, the switching circuit 20 consists of a MOSFET 200. The drain of the MOSFET 200 is electrically connected with the neutral point N of the stator coil of the stator 180, the source of the MOSFET 200 is electrically connected with the positive electrode of the sub power source 17, and the gate of the MOSFET 200 is electrically connected with the controller 21.

The controller 21 is designed to control the three-phase inverter 19 together with the switching circuit 20. The voltage sensor 16 is electrically connected with the controller 21. The voltage sensor 16 works to continuously or periodically measure the voltage of the sub power source 17, and to output a measured voltage to the controller 21.

Operations of the power supply system 2 will be described hereinafter.

(1) Operations in Motor being Inactivated

When the three-phase brushless motor 18 is inactivated, the controller 21 operates in a step-down converter mode to drive the MOSFET 200 of the switching circuit 20 on in step S21 of FIG. 2B. This electrically connects the neutral point N of the stator coil of the stator 180 with the sub power source 17.

In the step-down converter mode, the controller 21 works to control the three-phase inverter 19 as a step-down converter.

Specifically, in the step-down converter mode, the controller 21 works to drive and maintain all of the high-side MOSFETs 190*a*, 190*b*, and 190*c* and all of the low-side MOSFETs 190*d*, 190C, and 190*f* on and off complementary at a predetermined period in step S22.

At the period when the high-side MOSFETs 190*d*, 190*e*, and 190*f* are on and the low-side MOSFETs 190*a*, 190*b*, and 190*c* are off, a direct current flows from the main power source 10 through the high-side MOSFETs 190*a*, 190*b*, and 190*c* to the U-, V-, and W-phase windings 180*a*, 180*b*, and 180*c*.

For example, in the U-phase winding 180*a*, when the high-side MOSFET 190*a* of the first bridge arm is in on state while the low-side MOSFET 190b is in off state, the voltage of the main power source 10 causes a direct current to flow through the high-side MOSFET 190a to the U-phase winding 180a. This charges electromagnetic energy in the stator core.

Similarly, in each of the V- and W-phase windings 180b and 180c, the voltage of the main power source 10 causes a direct current to flow through a corresponding high-side MOSFET to a corresponding phase winding, thus charging electromagnetic energy in the stator core.

At that time, because a voltage drop is caused across each of the U-, V-, and W-phase windings 180a, 180b, and 180c, a potential of the neutral point N is lower than the voltage of the main power source 10. The potential of the neutral point N charges the sub power source 17.

At the period when the high-side MOSFETs 190d, 190e, and 190f are off and the low-side MOSFETs 190a, 190b, and 190c are on, in the first bridge arm, the electromagnetic energy stored in the stator core by the U-phase winding 180a is discharged so that a direct current flows through the U-phase winding 180a based on the voltage of the sub power source 17.

Similarly, in each of the second and third bridge arms, the electromagnetic energy stored in the stator core by a corresponding one phase winding 180b or 180c is discharged so that a direct current flows through a corresponding one phase winding 180b or 180c based on the voltage of the sub power source 17.

Specifically, the voltage of the main power source 10 is stepped down, and the stepped-down voltage charges the sub power source 17 so that the voltage of the sub power source 17 lies within the DC voltage range from 6 V to 8 V; this DC voltage range from 6 V to 8 V is the half of the DC voltage range of the main power source 10 from 12 V to 16 V. The step-down ratio of the power supply system 2 can be controlled by adjusting a duty cycle of each of the high-side MOSFETs 190a, 190b, and 190c and that of each of the low-side MOSFETs 190d, 190e, and 190f in order to increase the direct current through the windings 180a, 180b, and 180c.

This allows a sufficient voltage to be ensured in the sub power source 17 to thereby reliably drive the electric loads 160c. In addition, when the electric loads 160c include electronic circuits each made up of a microcomputer, because such microcomputers operate in a voltage of 5 V, it is unnecessary to provide a voltage converting IC for each of the microcomputers, thus simplifying the structure of the power supply system 2.

During the controller 21 executing the operations in steps S21 and S22, the controller 21 parallely determines, based on a measured voltage by the voltage sensor 16, whether the voltage of the sub power source 17 reaches a predetermined threshold, such as an upper limit of the DC voltage range from 6 V to 8 V in step S23.

Alternatively, in step S23, the controller 21 parallely determines, based on a measured voltage by the voltage sensor 16, whether the voltage of the sub power source 17 is equal to or greater than the predetermined threshold.

Upon determining that the voltage of the sub power source 17 is less than the predetermined threshold (NO in step S23), the controller 21 increases the duty-cycle of the inverter 19 in step S24 and continues the operations in steps S22 and S23.

Otherwise, upon determining that the voltage of the sub power source 17 reaches the predetermined threshold (YES in step S23), the controller 21 stops the operation in the step-down converter mode, and turns the MOSFET 200 off in step S25.

This achieves an effect of preventing excessive stepping-down of the voltage of the main power source 10 to thereby effectively stabilize the voltage of the sub power source 17. In addition, although the charging of the sub power source 17 is stopped, because a sufficient voltage is ensured in the sub power source 17, there is little influence on the electric loads 160c being activated.

(2) Operations in Motor being Activated

When the three-phase brushless motor 18 is activated, the controller 21 operates in a motor-drive and step-down converter mode to drive the MOSFET 200 of the switching circuit 20 on. This electrically connects the neutral point N of the stator coil of the stator 180 with the sub power source 17.

In the motor-drive and step-down converter mode, during at least some periods, the controller 21 works to operate in the motor-drive mode to individually drive each of the MOSFETs 190a, 190b, 190c, 190d, 190e, and 190f based on a corresponding one drive pulse with a predetermined duty cycle for causing U-, V-, and W-phase alternating currents Iu, Iu, and Iw having the waveforms illustrated in FIG. 2C to flow through the respective windings 180a, 180b, and 180c. This allows the three-phase inverter 19 to chop the voltage (DC voltage) of the main power source 10 to thereby generate U-, V-, and W-phase command voltages. The U-, V-, and W-phase command voltages are supplied to the respective U-, V-, and W-phase windings 180a, 180b, and 180c of the three-phase brushless motor 18 to thereby cause the three-phase alternating currents Iu, Iu, and Iw to flow through the respective three-phase windings 180a, 180b, and 180c. This creates torque to rotate the rotor.

A positive offset DC component illustrated in FIG. 2C boosts up the voltage of the main power source 10 in the same manner as the operations illustrated in FIG. 2B so as to charge the sub power source 17.

The positive offset current will be referred to as "zero-phase current I0".

Specifically, the zero-phase current I0 to flow from the main power source 10 through the high-side MOSFETs 190a, 190b, and 190c to the U-, V-, and W-phase windings 180a, 180b, and 180c.

For example, in the U-phase winding 180a, when the high-side MOSFET 190a of the first bridge arm is in on state while the low-side MOSFET 190b is in off state, the voltage of the main power source 10 causes a current to flow through the high-side MOSFET 190a to the U-phase winding 180a. This charges electromagnetic energy in the stator core.

Similarly, in each of the V- and W-phase windings 180b and 180c, the voltage of the main power source 10 causes a current to flow through a corresponding high-side MOSFET to a corresponding phase winding, thus charging electromagnetic energy in the stator core.

At that time, because a voltage drop is caused across each of the U-, V-, and W-phase windings 180a, 180b, and 180c, a potential of the neutral point N is lower than the voltage of the main power source 10. The potential of the neutral point N charges the sub power source 17.

At a next period, in the first bridge arm, when the low-side MOSFET 190d is turned on and the high-side MOSFET 190a is turned off, the electromagnetic energy stored in the stator core by the U-phase winding 180a is discharged so that a current flows through the U-phase winding 180a based on the voltage of the sub power source 17.

Similarly, in each of the second and third bridge arms, the electromagnetic energy stored in the stator core by a corresponding one phase winding 180b or 180c is discharged so that a current flows through a corresponding one phase winding 180b or 180c based on the voltage of the sub power source 17.

Specifically, the voltage of the main power source 10 is stepped down, and the stepped-down voltage charges the sub power source 17 so that the voltage of the sub power source 17 lies within the DC voltage range from 6 V to 8 V; this DC voltage range from 6 V to 8 V is the half of the DC voltage range of the main power source 10 from 12 V to 16 V.

Because the U-, V-, W-phase currents (three-phase alternating currents) are expressed by respective Iu, Iu, and Iw, the following equation is established:

$$Iu+Iv+Iw-I0=0$$

This equation provides the relationship between the zero-phase current I0 and the U-, V-, W-phase currents Iu, Iv, and Iw, this relationship is represented by the following equation:

$$I_0=(Iu+Iv+Iw)$$

When the zero-phase current $I_0$ is uniformly distributed into the U-, V-, W-phase currents Iu, Iv, and Iw, an average value of an amplitude of each of the U-, V-, W-phase currents Iu, Iv, and Iw is DC offset by $I_0/3$.

Electromagnetic energy to be created by the offset current $I_0/3$ achieves the effect of stepping down the voltage of the main power source 10 to be applied to the three-phase inverters 19. For this reason, the step-down ratio of the power supply system 2 can be controlled by adjusting the offset current $I_0/3$ in addition to a duty cycle of each of the high-side MOSFETs 190a, 190b, and 190c and that of each of the low-side MOSFETs 190d, 190e, and 190f.

This allows a sufficient voltage to be ensured in the sub power source 17 to thereby reliably drive the electric loads 160c.

During the controller 21 executing the aforementioned operations, the controller 21 parallely determines, based on a measured voltage by the voltage sensor 16, whether the voltage of the sub power source 17 reaches a predetermined threshold, such as an upper limit of the DC voltage range from 6 V to 8 V.

Alternatively, the controller 21 parallely determines, based on a measured voltage by the voltage sensor 16, whether the voltage of the sub power source 17 is equal to or greater than the predetermined threshold.

Upon determining that the voltage of the sub power source 17 is less than the predetermined threshold, the controller 21 continues the aforementioned operations.

This achieves an effect of preventing excessive stepping-down of the voltage of the main power source 10 to thereby effectively stabilize the voltage of the sub power source 17. In addition, although the charging of the sub power source 17 is stopped, because a sufficient voltage is ensured in the sub power source 17, there is little influence on the electric loads 160c being activated.

Note that, immediately after the activation of the three-phase brushless motor 18, a large rush current may flow through the stator coil of the stator 180 through the capacitor of the sub power source 17 when the stepping-down is not carried out during the three-phase brushless motor 18 being inactivated.

However, the power supply system 2 according to the second embodiment is configured to sufficiently charge the sub power source 17 during the three-phase brushless motor 18 being inactivated. Thus, it is possible to prevent a large rush current from flowing through the stator coil of the stator 180 even immediately after the activation of the three-phase brushless motor 18.

When the boosted level of the voltage of the main power source 10 is insufficient during the motor 12 being inactivated, an increase of the dc current allows the boosted level of the voltage of the main power source 10 to increase. When the boosted level of the voltage of the main power source 10 is insufficient during the motor 12 being activated, a positive increase of the zero-phase current I0 allows the boosted level of the voltage of the main power source 10 to increase.

As described above, the power supply system 2 has a simple structure without using DC to DC converters that supplies a voltage within the higher range from 12 V to 16 V to the electric loads 160a and that within the lower range from 6 V to 8 V to the electric loads 160c.

In addition, the power supply system 2 is designed to, during the three-phase brushless motor 18 being inactivated, use the three-phase inverter 19 and the stator coil of the stator 180 to thereby step down the voltage of the main power source 10 and to charge the sub power source 17 by the stepped-down voltage.

This allows, even if power is consumed by the electric loads 160c during the three-phase brushless motor 18 being inactivated, the voltage of the sub power source 17 to be reliably secured at a sufficient level. Thus, it is possible to reduce the fluctuation in the voltage of the sub power source 17.

The power supply system 2 is also configured to, even if the motor 18 is activated, stop the operation in the step-down mode, and turn the MOSFET 200 off while continuing the operation in the motor-drive mode when it is determined that the voltage of the sub power source 17 reaches the predetermined threshold. This makes it possible to prevent excessive stepping-down of the voltage of the main power source 10, thus effectively stabilizing the voltage of the sub power source 17.

The power supply system 2 is further configured to connect the sub power source 17 to the neutral point N of the stator coil of the stator 180 only when stepping down the voltage of the main power source 10. This prevents, even if there is a potential difference between the neutral point N and the sub power source 17, a leakage current from being created based on the potential difference between the neutral point N and the sub power source 17 when the voltage of the main power source 10 is not stepped down.

In the power supply system 2 according to the second embodiment, because the capacitor constitutes the sub power source 17, it is possible to charge and discharge the voltage of the sub power source 17 at a high speed as compared with another voltage-chargeable/dischargeable component constituting the sub power source 17. Moreover, it is possible to reduce the cost of the sub power source 17 as compared with another voltage-chargeable/dischargeable component.

In addition, in the second embodiment, the power supply system 2 is further configured to step down the voltage of the main power source 10 so that the stepped-down voltage lies within the lower voltage range that is the half of the higher voltage range of 12 V to 16 V. The present invention is not limited to the structure. Specifically, the power supply system 2 can be configured to step down the voltage of the main power source 10 so that the stepped-down voltage dies within the lower voltage range that is equal to or lower than the half of the higher voltage range of 12 V to 16 V. This increases a DC voltage range that the sub power source 17 can supply, increasing the versatility of the power supply system 2.

Third Embodiment

A power supply system 3 according to a third embodiment of the present invention will be described hereinafter.

The power supply system 3 according to the third embodiment is equipped with an alternator 22 an example of power generators for charging the main power source 10 in addition to the structure of the power supply system 1 according to the first embodiment.

Figure 3:
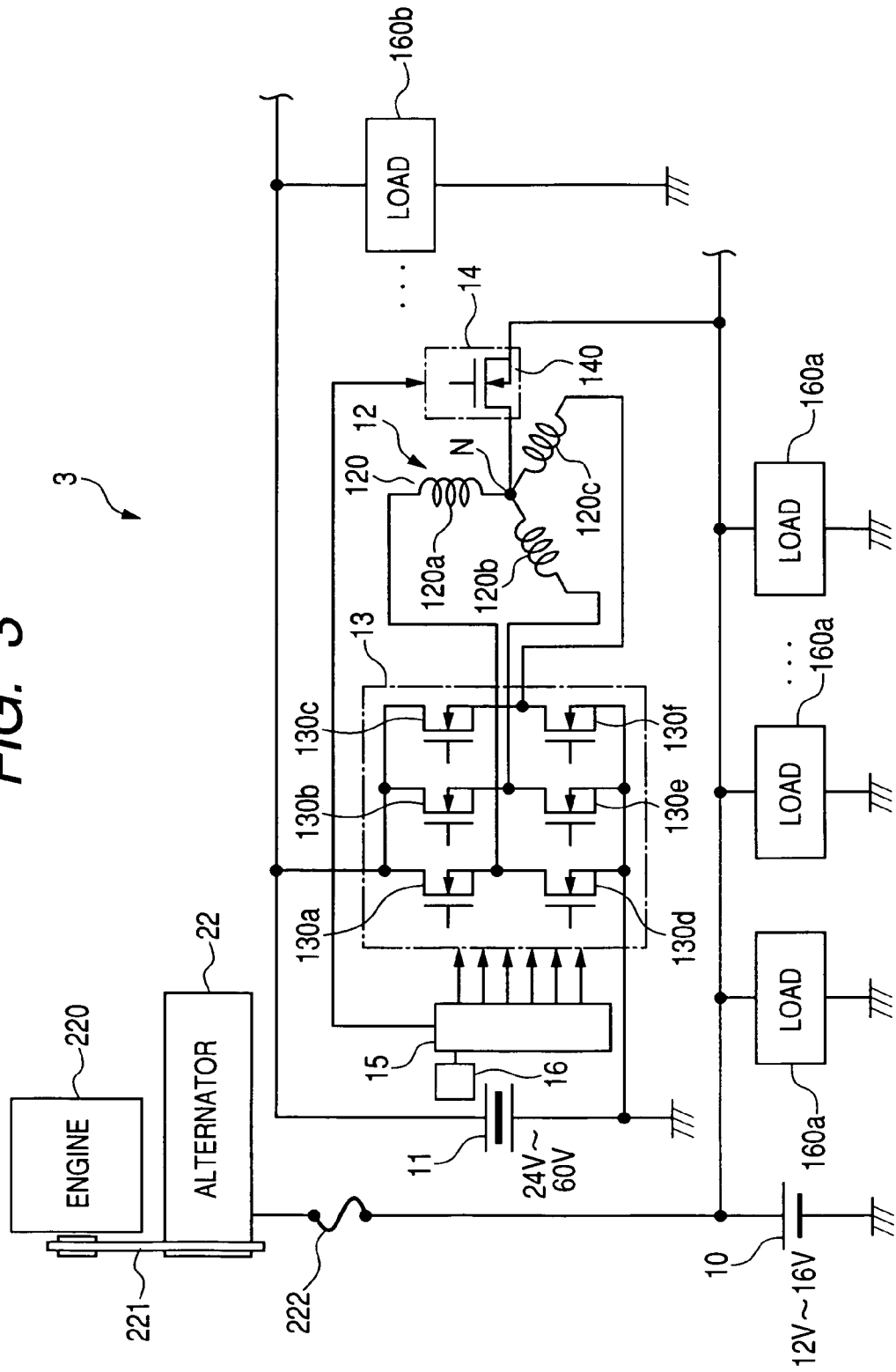
FIG. 3 is a circuit diagram schematically illustrating a example of the structure of a power supply system according to a third embodiment of the present invention.

FIG. 3 schematically illustrates an example of the structure of the power supply system 3 according to the third embodiment. The power supply system 3 of the third embodiment has substantially the same structure as that of the power supply system 1 of the first embodiment except for some differences described hereinafter. For this reason, like reference characters are assigned to like parts in the power supply systems according to the first and third embodiments so that descriptions of the parts of the power supply system 3 of the third embodiment will be omitted or simplified.

The power supply system 3 includes the main power source 10, the sub power source 11, the three-phase brushless motor 12, the three-phase inverter 13, the switching circuit 14, the controller 15, the voltage sensor 16, and the alternator 22.

The alternator 22 is equipped with a pulley (not shown) linked to a crankshaft of an engine 220 installed in the motor vehicle via a belt 221. The alternator 22 is rotatably driven by torque supplied from the engine 220 via the crankshaft and the pulley to thereby intermittently generate a DC voltage from an output terminal thereof. The output terminal is electrically connected with the positive electrode of the main power source 10 via a fuse 222.

The alternator 22 is configured to:

operate in a power generation mode to generate a DC voltage from the output terminal during the motor vehicle being decelerated to thereby charge the main power source 10; and operate in a power-generation inhibiting mode to inhibit the generation of the DC voltage.

Additionally, when running in the power-generation inhibiting mode, the alternator 22 works to monitor the voltage of the main power source 10 via the connection line therebetween, and stop the power-generation inhibiting mode upon determining that the monitored voltage of the main power source 10 is less than a predetermined threshold.

Operations of the power supply system 3 will be described hereinafter.

As well as the power supply system 1 according to the first embodiment, during the three-phase brushless motor 12 being inactivated and the alternator 22 being activated, the controller 15 of the power supply system 3 carries out the operations in steps S1 to S5 illustrated in FIG. 1B to thereby:

connect the neutral point N of the stator 120 to the main power source 10; and control the three-phase inverter 13 with which the stator coil of the stator 120 is electrically connected as a booster circuit to thereby boost the voltage of the main power source 10 and charge the sub power source 11 by the boosted voltage.

This allows, even if power is consumed by the electric loads 160b during the three-phase brushless motor 12 being inactivated, the voltage of the sub power source 11 to be reliably secured at a sufficient level. Thus, it is possible to reliably drive the three-phase brushless motor 12 and the electric loads 160b.

In addition, even if the three-phase brushless motor 12 is inactivated, when the voltage of the main power source 10 is less than the predetermined threshold, the controller 15 of the power supply system 3 caries out the operations in steps S11 to S15 illustrated in FIG. 2B to thereby:

connect the neutral point N of the stator 120 to the main power source 10; and control the three-phase inverter I3 with which the stator coil of the stator 120 is electrically connected as a step-down converter to thereby step down the voltage of the sub power source 11 within the DC voltage range from 24 V to 60 V to a voltage within the DC voltage range from 12 V to 11V and charge the main power source 10 by the stepped-down voltage.

This prevents redundant boosting of the voltage of the main power source 10 and reduction in the voltage of the main power source 10, making it possible to reliably drive the electric loads 160a.

Other operations of the power supply system 3 are substantially identical to those of the power supply system 1, and therefore, descriptions of which are omitted.

As described above, the power supply system 3 according to the third embodiment is configured to boost the voltage of the main power supply source 10 so as to charge the sub power source 11 by the boosted voltage while charging the main power source 10 by the alternator 22. This makes it possible to prevent the voltage of the main power source 10 from being reduced due to the charging of the sub power source 11.

The power supply system 3 is also configure to, when the voltage of the main power source 10 is less than the predetermined threshold during the three-phase brushless motor 12 being inactivated, step down the voltage of the sub power source 11 to thereby charge the main power source 10 without boosting the voltage of the main power source 10. This prevents redundant boosting of the voltage of the main power source 10 and reduction in the voltage of the main power source 10, making it possible to reliably drive the electric loads 160a.

In addition, in the power supply system 3, the alternator 22 is configured to stably secure the voltage of the main power source 10.

The alternator 22 is also configured to:

monitor the voltage of the main power source 10 via the connection line therebetween; and stop the power-generation inhibiting mode to thereby charge the main power source 10 upon determining that the monitored voltage of the main power source 10 is less than the predetermined threshold.

Thus, it is possible to prevent a drop in the engine output with the power generation.

Various modifications of the power supply system 3 according to the third embodiment will be described hereafter.

A power supply system 3A according to a first modification of the third embodiment will be described hereinafter.

Figure 4:
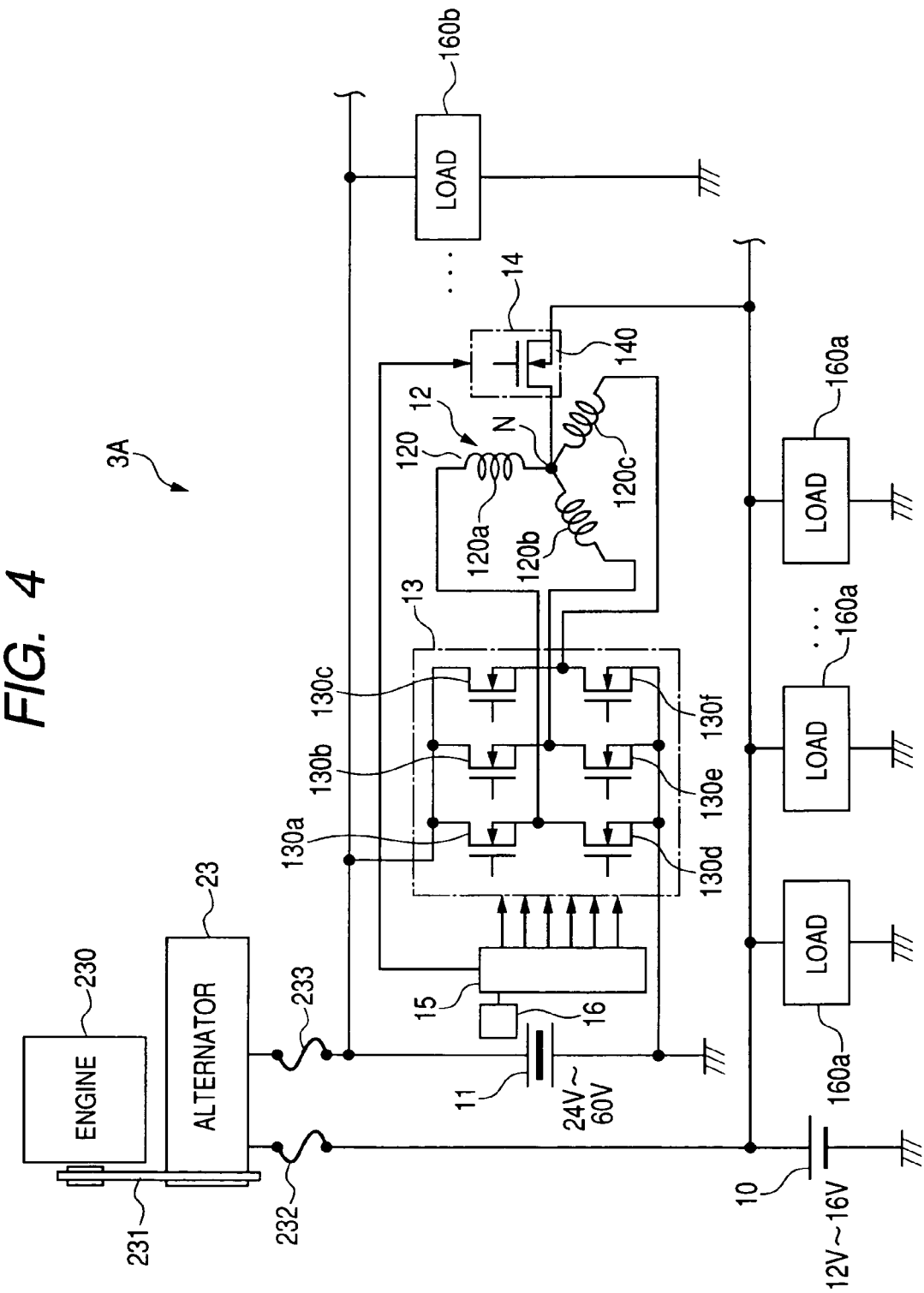
FIG. 4 is a circuit diagram schematically illustrating an example of the structure of a power supply system according to a first modification of the third embodiment of the present invention.

FIG. 4 schematically illustrates an example of the structure of the power supply system 3A according to the first modification of the third embodiment. The power supply system 3A has substantially the same structure as that of the power supply system 3 except for some differences described hereinafter. For this reason like reference characters are assigned to like parts in the power supply systems 3A and 3 so that descriptions of the parts of the power supply system 3A will be omitted or simplified.

The power supply system 3A includes the main power source 10, the sub power source 11, the three-phase brushless motor 12, the three-phase inverter 13, the switching circuit 14, the controller 15, the voltage sensor 16, and an alternator 23.

The alternator 23 is equipped with a pulley (not shown) linked to a crankshaft of an engine 230 installed in the motor vehicle via a belt 231. The alternator 23 is rotatable driven by torque supplied from the engine 230 via the crankshaft and the pulley to thereby intermittently generate a DC voltage from an output terminal thereof. The output terminal is electrically connected with both the positive electrode of the main power source 10 via a fuse 232 and the positive electrode of the sub power source 11 via a fuse 233.

The power supply system 3A has the same effects as the power supply system 3 according to the third embodiment. In addition, the power supply system 3A is configured such that, when the voltage of the sub power source 11 is less than a predetermined threshold, the alternator 23 charges the sub power source 11. This makes it possible to more reliably prevent the voltage of the sub power source 11, thus reliably driving the electric loads 160b.

A power supply system 3B according to a second modification of the third embodiment will be described hereinafter.

Figure 5:
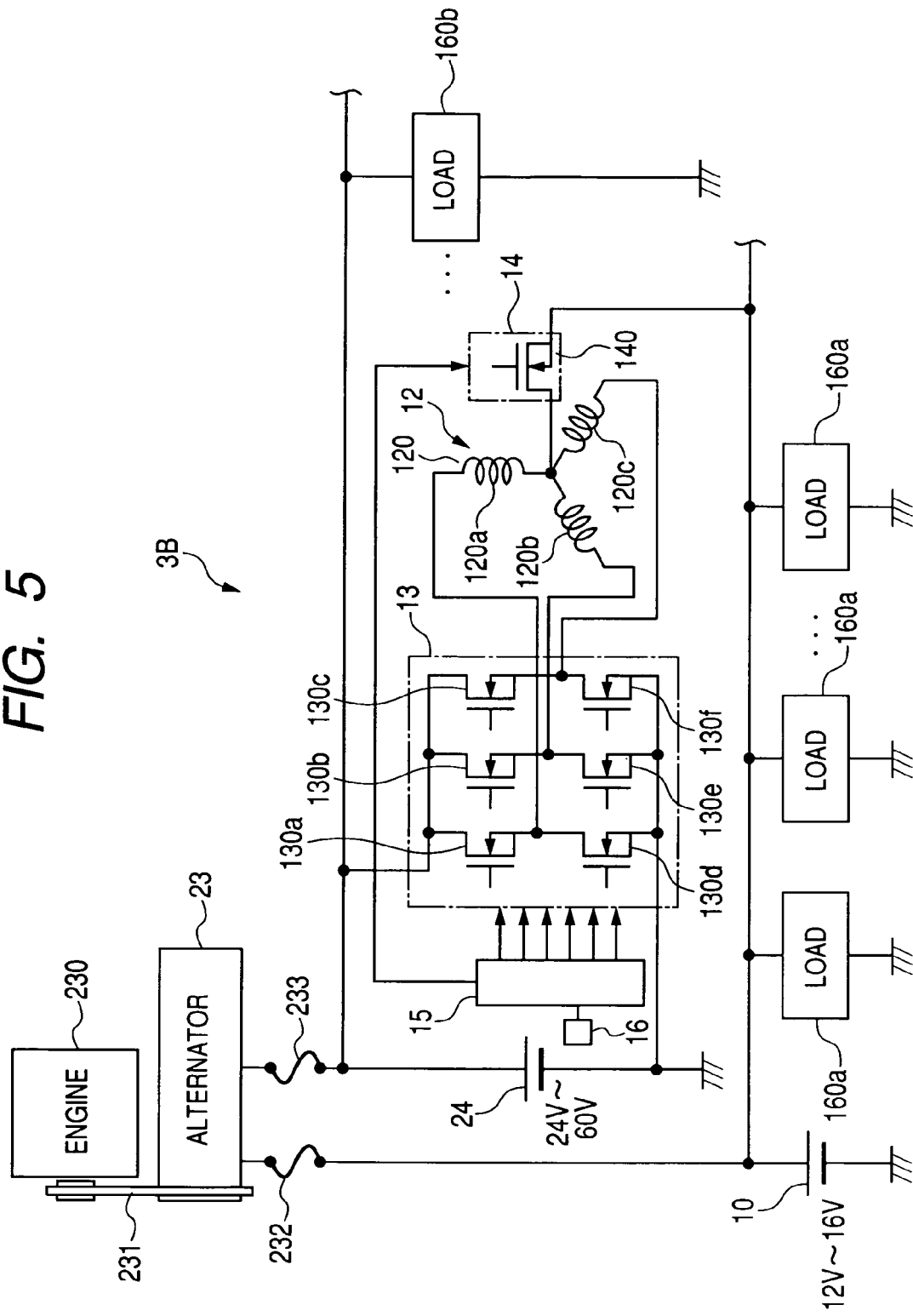
FIG. 5 is a circuit diagram schematically illustrating an example of the structure of a power supply system according to a second modification of the third embodiment of the present invention.

FIG. 5 schematically illustrates an example of the structure of the power supply system 3B according to the second modification of the third embodiment. The power supply system 3B has substantially the same structure as that of the power supply system 3A except for some differences described hereinafter. For this reason, like reference characters are assigned to like parts in the power supply systems 3A and 3B so that descriptions of the parts of the power supply system 3B will be omitted or simplified.

The power supply system 3B includes the main power source 10, a sub power source 24, the three-phase brushless motor 12, the three-phase inverter 13, the switching circuit 14, the controller 15, the voltage sensor 16, and the alternator 23. The sub power source 24 consists of a battery chargeable and dischargeable within a DC voltage range from 24 V to 60 V.

The power supply system 3B has the same effects as the power supply system 3 according to the third embodiment.

A power supply system 3C according to a third modification of the third embodiment will be described hereinafter.

Figure 6:
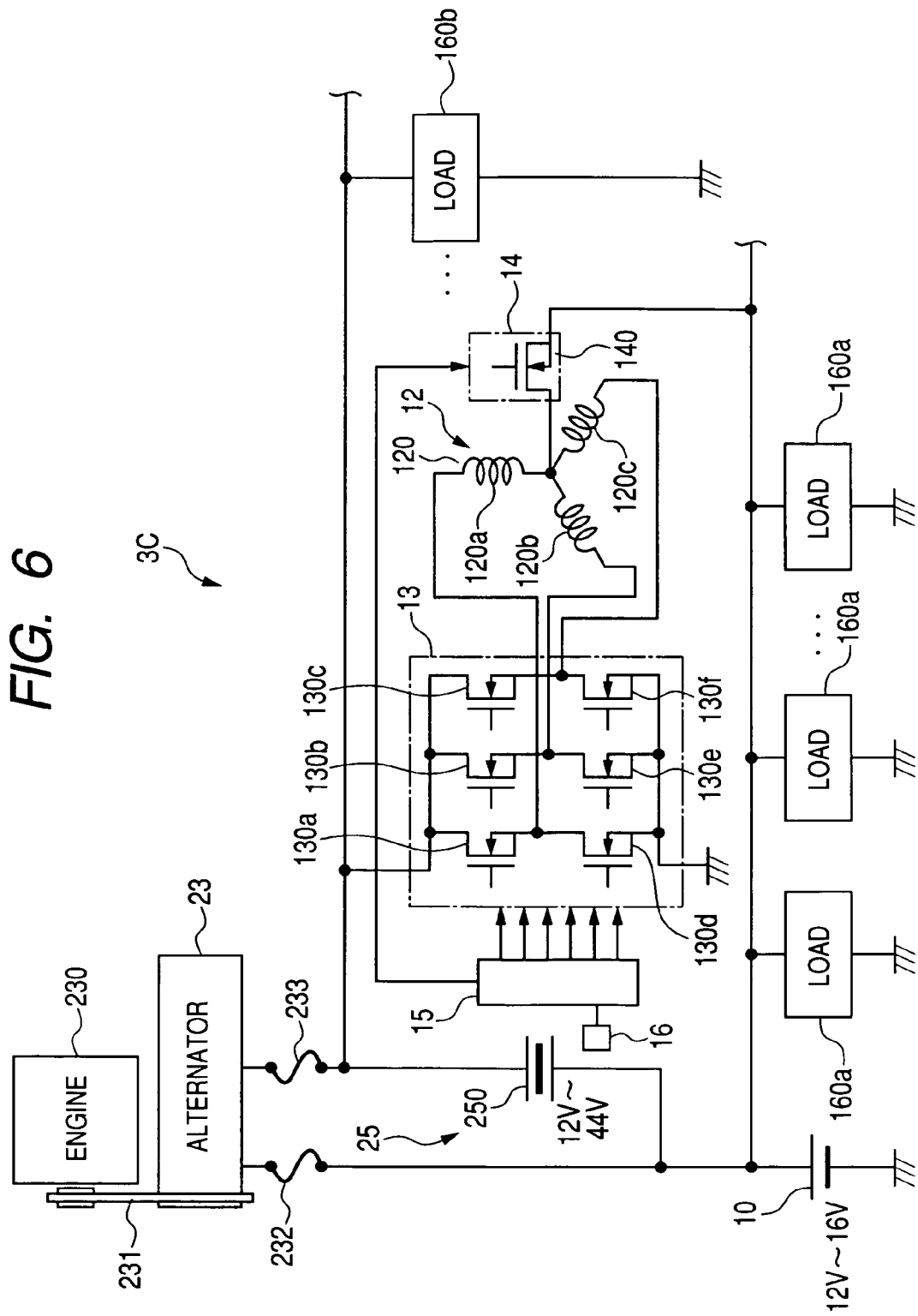
FIG. 6 is a circuit diagram schematically illustrating an example of the structure of a power supply system according to a third modification of the third embodiment of the present invention.

FIG. 6 schematically illustrates an example of the structure of the power supply system 3C according to the third modification of the third embodiment. The power supply system 3C has substantially the same structure as that of the power supply system 3A except for some differences described hereinafter. For this reason, like reference characters are assigned to like parts in the power supply systems 3A and 3C so that descriptions of the parts of the power supply system 3C will be omitted or simplified.

The power supply system 3C includes the main power source 10, a sub power source 25, the three-phase brushless motor 12, the three-phase inverter 13, the switching circuit 14, the controller 15, the voltage sensor 16, and the alternator 23. The sub power source 25 consists of a pair of capacitors 250 that are connected with each other in series and are each chargeable and dischargeable within a DC voltage range from 12 V to 44 V.

The power supply system 3C has the same effects as the power supply system 3 according to the third embodiment. In addition, the power supply system 3C reduces its cost as compared with a power supply system with a sub power source that consists of a battery.

A power supply system 3D according to a fourth modification of the third embodiment will be described hereinafter.

Figure 7:
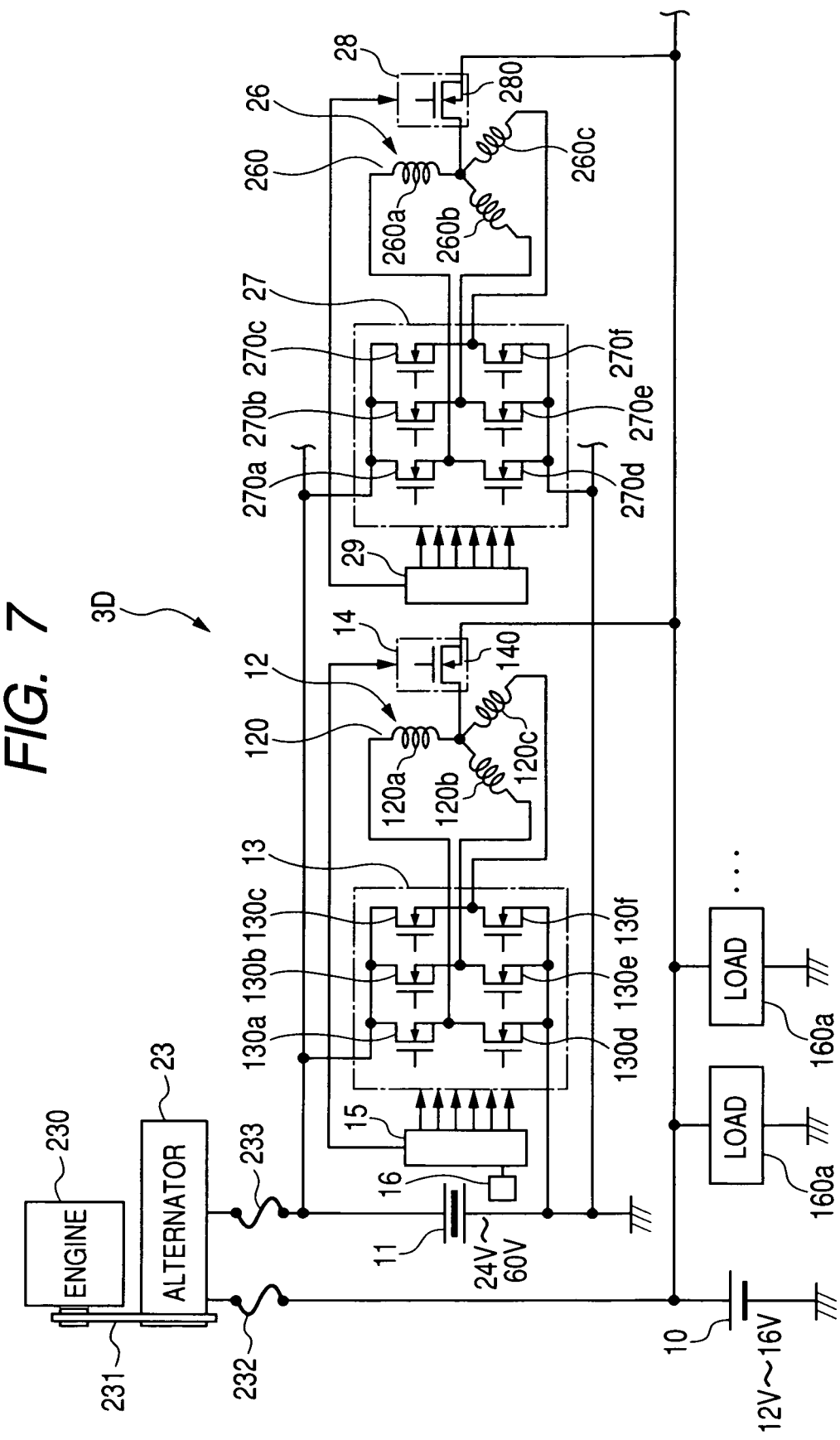
FIG. 7 is a circuit diagram schematically illustrating an example of the structure of a power supply system according to a fourth modification of the third embodiment of the present invention.

FIG. 7 schematically illustrates an example of the structure of the power supply system 3D according to the fourth modification of the third embodiment. The power supply system 3D has substantially the same structure as that of the power supply system 3A except for some differences described hereinafter. For this reason, like reference characters are assigned to like parts in the power supply systems 3A and 3D so that descriptions of the parts of the power supply system 3D will be omitted or simplified.

The power supply system 3D includes the main power source 10, the sub power source 11, a pair of the three-phase brushless motor 12 and a three-phase brushless motor 26, a pair of the three-phase inverter 13 and a three-phase inverter 27, a pair of the switching circuit 14 and a switching circuit 28, a pair of the controller 15 and a controller 29, the voltage sensor 16, and the alternator 23.

The three-phase brushless motor 26 is equipped with a magnetized rotor and a stator 260 with a stator core and a stator coil. The stator core of the three-phase brushless motor 26 is for example common with the three-phase brushless motor 12. The stator coil 26 consists of a U-phase stator winding 260a, a V-phase stator winding 260b, and a W-phase stator winding 260c. The structure of the three-phase brushless motor 26 is the same as that of the three-phase brushless motor 12.

The structure of the three-phase inverter 27 is the same as that of the three-phase inverter 13, and the structure of the switching circuit 28 is the same as that of the switching circuit 14.

Specifically, the three-phase inverter 13 is composed of a first pair (bridge arm) of series-connected high-side and low-side MOSFETs 270a and 270d, a second pair of series-connected high-side and low-side MOSFETs 270b and 270e, and a third pair of series-connected high-side and low-side MOSFETs 270c and 270e. The first to third bridge arms of MOSFETs 270a to 270e are parallely connected with each other in bridge configuration.

The drains of the respective high-side MOSFETs 270a, 270b, and 270c are commonly connected with each other to constitute a high-side DC terminal of the three-phase inverter 27, and the high-side DC terminal of the three-phase inverter 27 is electrically connected with the positive electrode of the sub power source 11. The sources of the respective low-side MOSFETs 270d, 270e, and 270f are commonly connected with each other to constitute a low-side DC terminal of the three-phase inverter 27, and the low-side DC terminal of the three-phase inverter 27 is grounded so as to be electrically connected to the negative electrode of the sub power source 11.

A series connection point between the high-side and low-side MOSFETs 270a and 270d of the first pair constitutes an AC terminal to be electrically connected with an output lead extending from the other end (output end) of the U-phase winding 260a. Similarly, a series connection point between the high-side and low-side MOSFETs 270b and 270e of the second pair constitutes an AC terminal to be electrically connected with an output lead extending from the other end (output end) of the V-phase winding 260b. Moreover, a series connection point between the high-side and low-side MOSFETs 270c and 270f of the third pair constitutes an AC terminal to be electrically connected with an output lead extending from the other end (output end) of the W-phase winding 260c.

The switching circuit 28 consists of a MOSFET 280. The drain of the MOSFET 280 is electrically connected with the neutral point N of the stator coil of the stator 260, the source of the MOSFET 280 is electrically connected with the positive electrode of the main power source 10, and the gate of the MOSFET 280 is electrically connected with the controller 29.

Under control of the controller 29, the MOSFET 280 works to be turned on or off to thereby electrically connect or disconnect between the neutral point N of the stator coil of the stator 260 and the main power source 10.

The controller 29 is designed to control the three-phase inverter 27 together with the switching circuit 28. Specifically, the controller 29 is electrically connected with the gate of each of the high-side MOSFETs 270a to 270c and that of each of the low-side MOSFETs 270d to 270f.

The voltage sensor 16 is electrically connected with the controller 15 and the controller 29. The voltage sensor 16 works to continuously or periodically measure the voltage of the sub power source 11, and to output a measured voltage to the controller 15 and the controller 29.

Specifically, the power supply system 3D is configured to boost the voltage of the main power source 10 to thereby charge the sub power source 11 by the boosted voltage when at least one of the three-phase brushless motors 13 and 26 is inactivated. This achieves an additional effect of more reliably preventing the reduction in the voltage of the sub power source 11.

Fourth Embodiment

A power supply system 4 according to a fourth embodiment of the present invention will be described hereinafter.

The power supply system 4 according to the fourth embodiment is equipped with the alternator 22 for charging the main power source 10 in addition to the structure of the power supply system 2 according to the second embodiment.

Figure 8:
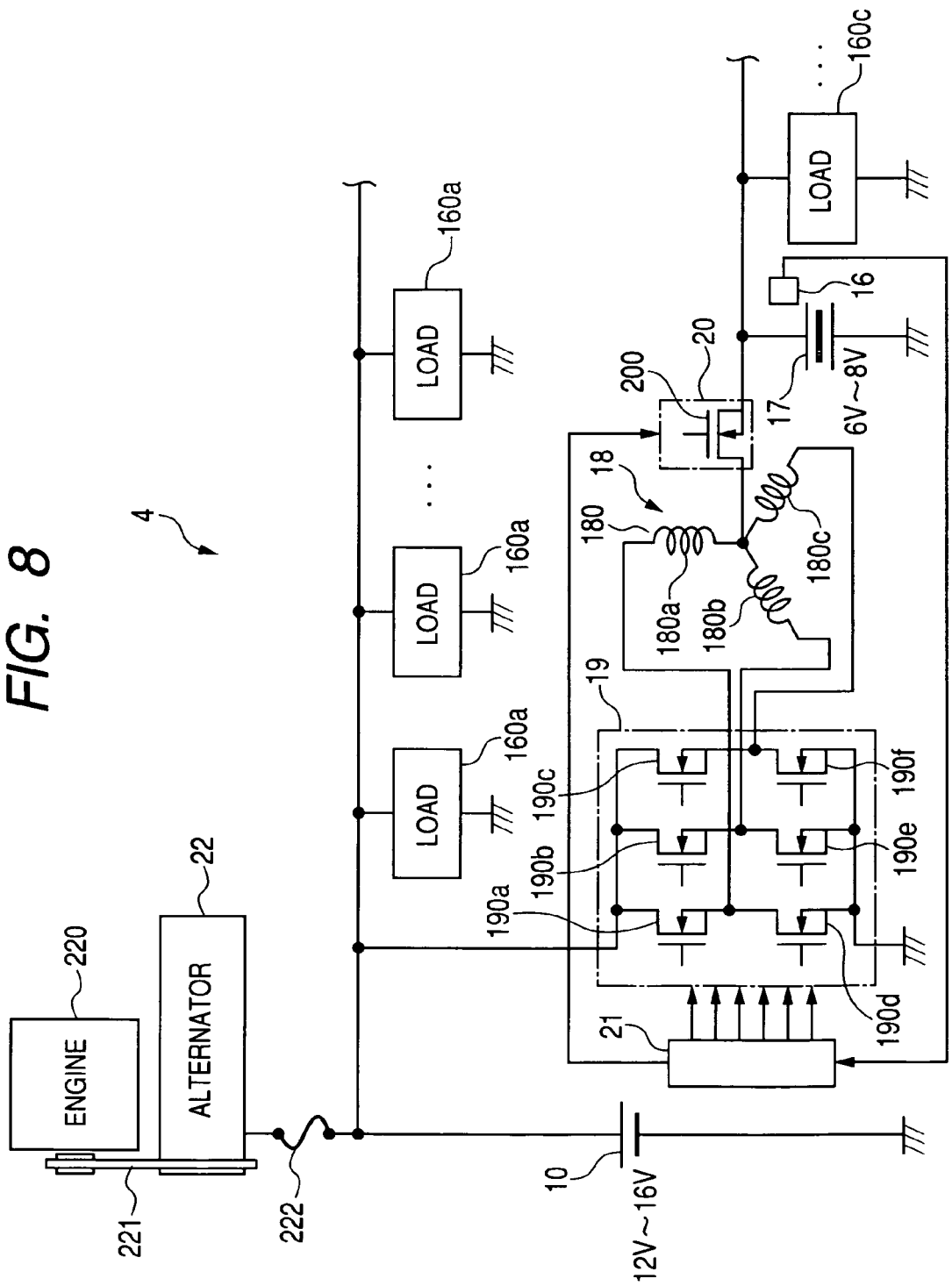
FIG. 8 is a circuit diagram schematically illustrating an example of the structure of a power supply system according to a fourth embodiment of the present invention.

FIG. 8 schematically illustrates an example of the structure of the power supply system 4 according to the fourth embodiment. The power supply system 4 of the fourth embodiment has substantially the same structure as that of the power supply system 2 of the second embodiment except for some differences described hereinafter. For this reason, like reference characters are assigned to like parts in the power supply systems according to the second and forth embodiments so that descriptions of the parts of the power supply system 4 of the fourth embodiment will be omitted or simplified.

The power supply system 4 includes the main power source 10, the sub power source 17, the three-phase brushless motor 18, the three-phase inverter 19, the switching circuit 20, the controller 21, the voltage sensor 16, and the alternator 22.

The alternator 22 is equipped with a pulley (not shown) linked to a crankshaft of the engine 220 installed in the motor vehicle via the belt 221. The alternator 22 is rotatably driven by torque supplied from the engine 220 via the crankshaft and the pulley to thereby intermittently generate a DC voltage from an output terminal thereof. The output terminal is electrically connected with the positive electrode of the main power source 10 via the fuse 222.

The alternator 22 is configured to:

operate in a power generation mode to generate a DC voltage from the output terminal during the motor vehicle being decelerated to thereby charge the main power source 10; and operate in a power-generation inhibiting mode to inhibit the generation of the DC voltage.

Additionally, when running in the power-generation inhibiting mode, the alternator 22 works to monitor the voltage of the main power source 10 via the connection line therebetween, and stop the power-generation inhibiting mode upon determining that the monitored voltage of the main power source 10 is less than a predetermined threshold.

Operations of the power supply system 4 will be described hereinafter.

As well as the power supply system 2 according to the second embodiment, during the three-phase brushless motor 12 being inactivated and the alternator 22 being activated, the controller 21 of the power supply system 4 carries out the operations in steps S21 to S25 illustrated in FIG. 2B to thereby:

connect the neutral point N of the stator 180 to the sub power source 17; and control the three-phase inverter 19 with which the stator coil of the stator 180 is electrically connected as a step-down converter to thereby step down the voltage of the main power source 10 and charge the sub power source 17 by the stepped down voltage.

This allows, even if power is consumed by the electric loads 160c during the three-phase brushless motor 18 being inactivated, the voltage of the sub power source 17 to be reliably secured at a sufficient level. Thus, it is possible to reliably drive the electric loads 160c.

In addition, even if the three-phase brushless motor 18 is inactivated, when the voltage of the main power source 10 is less than the predetermined threshold, the controller 21 of the power supply system 4 carries out the operations in steps S1 to S5 illustrated in FIG. 1B to thereby:

connect the neutral point N of the stator 180 to the sub power source 17; and control the three-phase inverter 19 with which the stator coil of the stator 180 is electrically connected as a booster to thereby step up the voltage of the sub power source 17 within the DC voltage range from 6 V to 8 V to a voltage within the DC voltage range from 12 V to 16V and charge the main power source 10 by the stepped-up voltage.

This prevents redundant stepping-down of the voltage of the main power source 10 and reduction in the voltage of the main power source 10, making it possible to reliably drive the three-phase brushless motor 18 and the electric loads 160a.

Other operations of the power supply system 4 are substantially identical to those of the power supply system 2, and therefore, descriptions of which are omitted.

As described above, the power supply system 4 according to the forth embodiment is configured to step down the voltage of the main power supply source 10 so as to charge the sub power source 17 by the stepped-down voltage while charging the main power source 10 by the alternator 22. This makes it possible to prevent the voltage of the main power source 10 from being reduced due to the charging of the sub power source 17.

The power supply system 4 is also configure to, when the voltage of the main power source 10 is less than the predetermined threshold during the three-phase brushless motor 18 being inactivated, boost the voltage of the sub power source 17 to thereby charge the main power source 10 without stepping down the voltage of the main power source 10. This prevents redundant stepping-down of the voltage of the main power source 10 and reduction in the voltage of the main power source 10, making it possible to reliably drive the three-phase brushless motor 18 and the electric loads 160a.

In addition, in the power supply system 4, the alternator 22 is configured to stably secure the voltage of the main power source 10.

The alternator 22 is also configured to:

monitor the voltage of the main power source 10 via the connection line therebetween; and stop the power-generation inhibiting mode to thereby charge the main power source 10 upon determining that the monitored voltage of the main power source 10 is less than the predetermined threshold.

Thus, it is possible to prevent a drop in the engine output with the power generation.

Fifth Embodiment

A power supply system 5 according to a fifth embodiment of the present invention will be described hereinafter.

The power supply system 5 according to the fifth embodiment is composed of the power supply system 3A according to the first embodiment of the third embodiment and the power supply system 2 according to the second embodiment.

Figure 9:
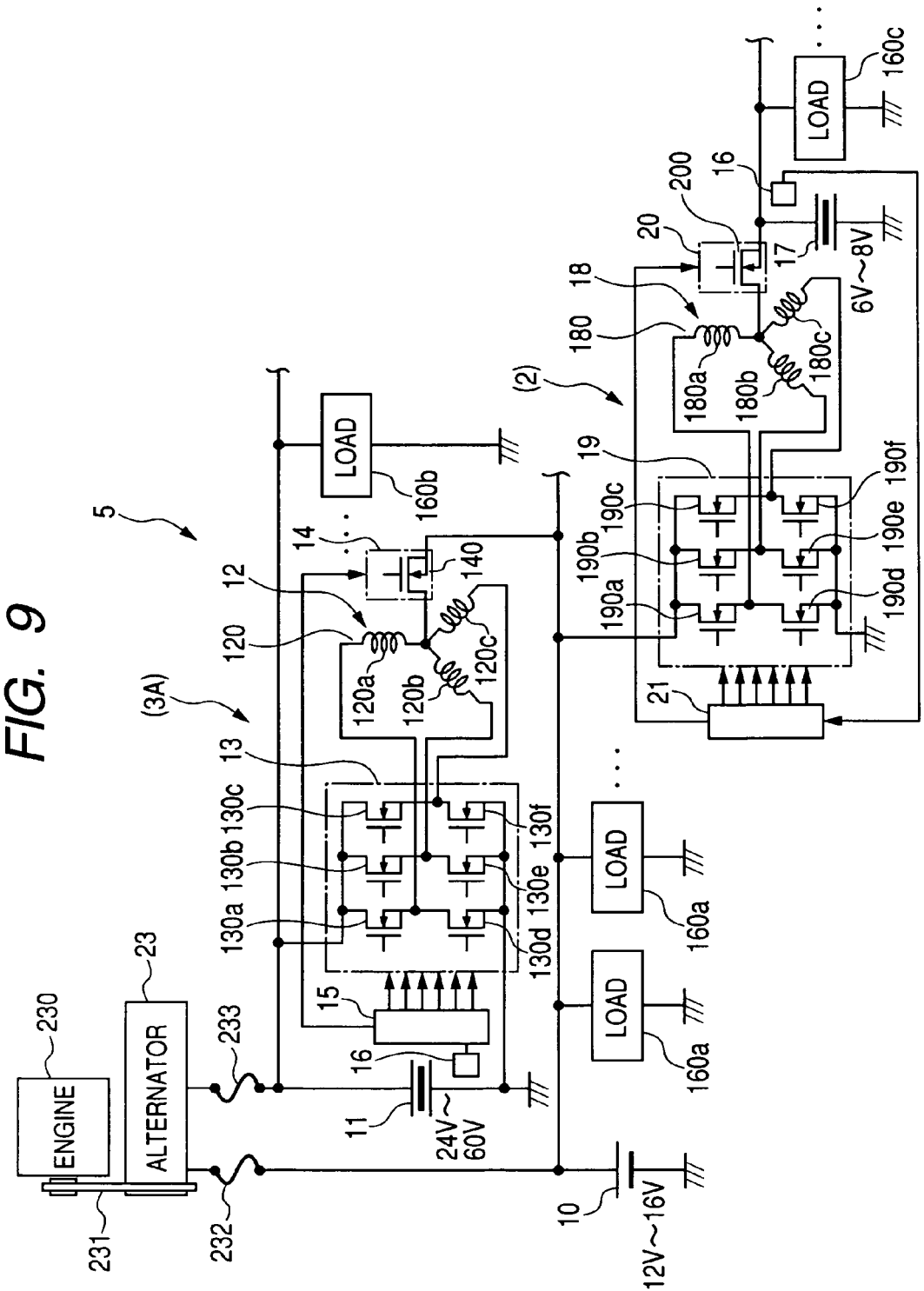
FIG. 9 is a circuit diagram schematically illustrating an example of the structure of a power supply system according to a fifth embodiment of the present invention.

FIG. 9 schematically illustrates an example of the structure of the power supply system 5 according to the fifth embodiment. The power supply system 5 of the fifth embodiment has substantially the same structure as that of each of the power supply system 3A and the power supply system 2. For his reason, like reference characters are assigned to like parts in the power supply systems according to the second, third, and fifth embodiments so that descriptions of the parts of the power supply system 5 of the fifth embodiment will be omitted or simplified.

The power supply system 5 includes the main power source 10, the sub power source 11, the three-phase brushless motor 12, the three-phase inverter 13, the switching circuit 14, the controller 15, the voltage sensor 16, and the alternator 23. These components constitute the power supply system 3A.

The power supply system 5 also includes the main power source 10, the sub power source 17, the three-phase brushless motor 18, the three-phase inverter 19, the switching circuit 20, the controller 21, the voltage sensor 16, and the alternator 22. These components constitute the power supply system 2.

The power supply system 5 achieves the same effects as the first modification of the third embodiment and the second embodiment. In addition, the power supply system 5 is capable of supplying three different voltage ranges of "6 V to 8 V", "12 V to 16 V", and "24 V to 60 V" to the respective electric loads 160c, 160a, and 160b. This more increases the versatility of the power supply system 5.

Sixth Embodiment

A power supply system 6 according to a sixth embodiment of the present invention will be described hereinafter.

The power supply system 6 according to the sixth embodiment is configured such that the sub power source 11 supplies a voltage to an excitation circuit 30 for the alternator 22.

Figure 10:
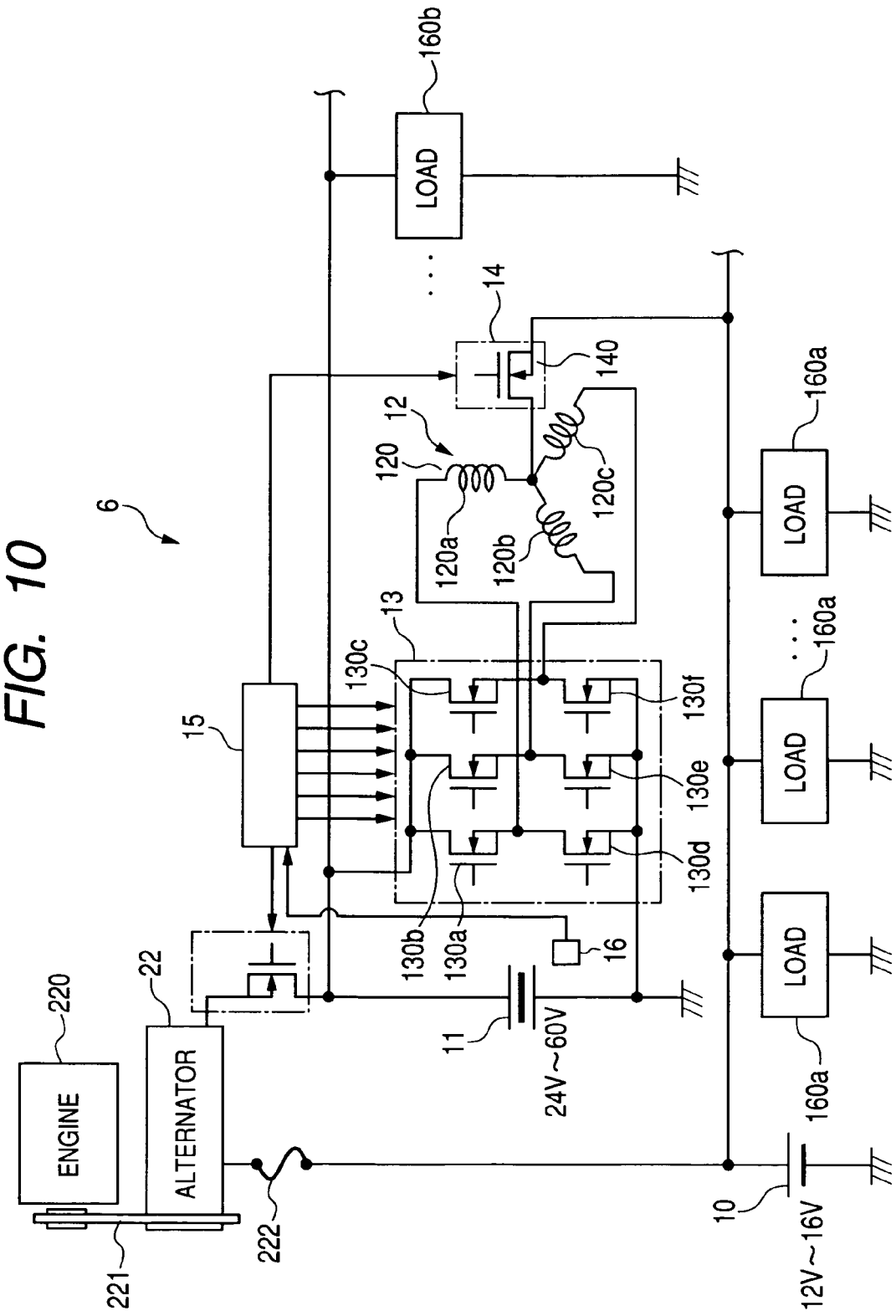
FIG. 10 is a circuit diagram schematically illustrating an example of the structure of a power supply system according to a sixth embodiment of the present invention.

FIG. 10 schematically illustrates an example of the structure of the power supply system 6 according to the six embodiment. The power supply system 6 of the sixth embodiment has substantially the same structure as that of the power supply system 3 of the third embodiment except for some differences described hereinafter. For this reason, like reference characters are assigned to like parts in the power supply systems according to the third and sixth embodiments so that descriptions of the parts of the power supply system 6 of the sixth embodiment will be omitted or simplified.

The power supply system 6 includes the main power source 10, the sub power source 11, the three-phase brushless motor 12, the three-phase inverter 13, the switching circuit 14, the controller 15, the voltage sensor 16, the alternator 22, and an excitation circuit 30.

The excitation circuit 30 is operative to excite an exciting coil 22a of the alternator 22. The excitation circuit 30 consists of, for example, a MOSFET 300. The drain of the MOSFET 300 is electrically connected with the positive electrode of the sub power source 11, and the source of the MOSFET 300 is electrically connected with the excitation coil 22a of the alternator 22. The gate of the MOSFET 300 is electrically connected with the controller 15.

Operations of the power supply system 6 will be described hereinafter.

As well as the power supply system 3 according to the third embodiment, the controller 15 carries out the operations in steps S1 to S5 illustrated in FIG. 1B or the operations in steps S11 to S16 to thereby:

boost the voltage of the main power source 10;

charge the sub power source 11 by the boosted voltage;

switch the MOSFET 300 on and off based on a preset duty cycle so as to convert the boosted voltage into an appropriate voltage; and supply the appropriate voltage to the exciting coil 22a of the alternator 22.

The exciting coil 22a mounted on a core of a rotor (not shown) of the alternator is energized while the rotor rotates to thereby create magnetic fluxes. The created magnetic fluxes magnetize the rotor core to provide the field poles.

The rotation of the filed poles creates magnetic fluxes, and the created magnetic fluxes induce a three-phase AC voltage in three-phase stator windings. A rectifier of the alternator 22 full-wave rectifies the induced three-phase AC voltage induced in the stator windings to a DC voltage.

When the controller 15 does not boost the voltage of the main power source 10, the controller 15 switches the MOSFET 300 on and off based on a preset duty cycle so as to convert the voltage of the sub power source 11 into an appropriate voltage, and supplies the appropriate voltage to the exciting coil 22a of the alternator 22.

Specifically, to the controller 15, parameter data indicative of heat deterioration of the alternator 22 and the MOSFET 300 including a temperature of the alternator 22, a temperature of the MOSFET 300, and the voltage of the sub power source 11, is configured to be periodically or continuously inputted.

Based on the data inputted thereto, the controller 15 controls the switching of the MOSFET 300 to thereby obtain a voltage suitable for the temperature of the alternator 22, the temperature of the MOSFET 300, and the voltage of the sub power source 11.

Other operations of the power supply system 6 are substantially identical to those of the power supply system 3, and therefore, descriptions of which are omitted.

As described above, the power supply system 6 according to the sixth embodiment is configured to boost the voltage of the main power supply source 10 so as to charge the sub power source 11 by the boosted voltage.

In addition, the power supply system 6 is configured to supply the voltage of the sub power source 11 to the alternator 22.

The voltage to be charged in the sub power source 11 and that to be supplied to the alternator 22 are higher than the voltage of the main power source 10. For this reason, as compared with the exciting of the excitation coil 22a of the alternator 22 by the voltage of the main power source 10, it is possible to increase the power generation capacity of the alternator 22.

The power supply system 6 is also configured to adjust the voltage to be supplied to the alternator 22 based on the parameter data indicative of heat deterioration of the alternator 22 and the MOSFET 300. This achieves an additional effect of reducing the heat deterioration of the alternator 22 and the MOSFET 300.

In the third to sixth embodiments, the alternator 22 is rotatably driven by torque supplied from the engine, but it can be rotatably driven by torque obtained by another mechanism, such as the rotation of the axle shaft of the motor vehicle.

In the aforementioned embodiments and their modifications, the three-phase motors and three-phase inverters are used, but other multiphase motors and corresponding other multiphase inverters can be used.

While there has been described what is at present considered to be the embodiments and their modifications of the present invention, it will be understood that various modifications which are not described yet may be made therein, and it is intended to cover in the appended claims all such modifications as fall with the true spirit and scope of the invention.

What is claimed is:

1. A power supply system comprising:
   a chargeable and dischargeable first power storage device having one potential terminal, an other potential terminal, and a first chargeable voltage range;
   a chargeable and dischargeable second power storage device having one potential terminal, an other potential terminal, and a second chargeable voltage range lower than the first chargeable voltage range;
   a multiphase motor having a star-connected multiphase stator windings with a neutral point, the multiphase motor working to generate torque when the star-connected multiphase stator windings are energized, the neutral point being electrically connected with the one potential terminal of the second power storage device;
   a multiphase inverter including a plurality of switching elements connected with each other in bridge configuration to provide a high-side direct-current (DC) terminal and a low-side direct-current (DC) terminal, the high-side DC terminal being electrically connected with the one potential terminal of the first power storage device, the low-side DC terminal being electrically connected with the other potential terminal of the first power storage device, any one of the high-side and low-side DC terminals being electrically connected with the other potential terminal of the second power storage device; and
   a controller electrically connected with the plurality of switching elements, the controller working to switch the plurality of switching elements on and off during the multiphase motor being activated to thereby:
      convert a voltage of the first power storage device into a multiphase alternating-current (AC) voltage so as to supply the multiphase AC voltage to the multiphase motor; and
      boost the voltage of the second power storage device to charge the first power storage device by the boosted voltage,
   the controller working to switch the plurality of switching elements on and off during the multiphase motor being inactivated to thereby boost the voltage of the second power storage device to charge the first power storage device by the boosted voltage.

2. The power supply system according to claim 1, wherein the voltage charged in the first power storage device during the multiphase motor being inactivated is greater than that charged in the first power storage device during the multiphase motor being activated.

3. The power supply system according to claim 1, wherein the power supply system is installed in a motor vehicle, further comprising:
   a power generator driven by torque created in the motor vehicle to intermittently generate power, the power generated by the power generator charging the second power storage device,
   the controller working to switch the plurality of switching elements on and off during the multiphase motor being inactivated and the power generator generating the power to thereby boost the voltage of the second power storage device and charge the first power storage device by the boosted voltage.

4. The power supply system according to claim 1, wherein the controller works to switch the plurality of switching elements on and off during the multiphase motor being activated to thereby cause multiphase alternating currents to flow through the corresponding multiphase stator windings, each of the multiphase alternating currents being DC offset, and the controller works to switch the plurality of switching elements on and off during the multiphase motor being inactivated to thereby cause a direct current to flow through each of the multiphase stator windings.

5. The power supply system according to claim 3, wherein the power generator operates in a power generation mode to generate the power during the motor vehicle being decelerated, and operates in a power-generation inhibiting mode to inhibit generation of the power during the motor vehicle being driven at least except when being decelerated, and
   wherein, during the power generator operating in the power-generation inhibiting mode, when the voltage of the second power storage device is less than a predetermined threshold, the power generator works to stop the power-generation inhibiting mode to thereby charge the second power storage device.

6. The power supply system according to claim 3, wherein the power generator works to charge the first and second power storage devices, and the controller works to, even though the multiphase motor being inactivated, switch the plurality of switching elements on and off to thereby step down the voltage of the first power storage device to charge the second power storage device by the stepped-down voltage when the voltage of the second power storage device is less than a predetermined threshold.

7. The power supply system according to claim 1, wherein the power supply system is installed in a motor vehicle, further comprising:
   a power generator driven by torque created in the motor vehicle to intermittently generate power, the power generated by the power generator charging the second power storage device, the power generator including an excitation circuit,
   wherein the controller works to supply the boosted voltage to the excitation circuit of the power generator.

8. The power supply system according to claim 1, wherein the power supply system is installed in a motor vehicle, further comprising:
   a power generator driven by torque created in the motor vehicle to intermittently generate power, the power generated by the power generator charging the second power storage device, the power generator including an excitation circuit,
   wherein the first power storage device works to supply the voltage thereof to the excitation circuit of the power generator.

9. The power supply system according to claim 1, wherein the controller works to stop the boosting of the voltage of the second power storage device when the voltage of the first power storage device is equal to or greater than a predetermined threshold.

10. The power supply system according to claim 1, wherein the controller works to switch the plurality of switching elements on and off at least during the multiphase motor being inactivated to thereby boost the voltage of the second power storage device so that the boosted voltage is equal to or greater twice the voltage of the second power storage device.

11. A power supply system comprising:

a chargeable and dischargeable first power storage device having one potential terminal, an other potential terminal, and a first chargeable voltage range;

a chargeable and dischargeable second power storage device having one potential terminal, an other potential terminal, and a second chargeable voltage range lower than the first chargeable voltage range;

a multiphase motor having a star-connected multiphase stator windings with a neutral point, the multiphase motor working to generate torque when the star-connected multiphase stator windings are energized, the neutral point being electrically connected with the one potential terminal of the second power storage device;

a multiphase inverter including a plurality of switching elements connected with each other in bridge configuration to provide a high-side direct-current (DC) terminal and a low-side direct-current (DC) terminal, the high-side DC terminal being electrically connected with the one potential terminal of the first power storage device, the low-side DC terminal being electrically connected with the other potential terminal of the first power storage device, any one of the high-side and low-side DC terminals being electrically connected with the other potential terminal of the second power storage device; and a controller electrically connected with the plurality of switching elements, the controller working to switch the plurality of switching elements on and off during the multiphase motor being activated to thereby:

convert a voltage of the first power storage device into a multiphase alternating-current (AC) voltage so as to supply the multiphase AC voltage to the multiphase motor; and step down the voltage of the first power storage device to charge the second power storage device by the stepped-down voltage, the controller working to switch the plurality of switching elements on and off during the multiphase motor being inactivated to thereby step down the voltage of the first power storage device to charge the second power storage device by the stepped-down voltage.

12. The power supply system according to claim 11, wherein the power supply system is installed in a motor vehicle, further comprising:

a power generator driven by torque created in the motor vehicle to intermittently generate power, the power generated by the power generator charging the first power storage device, the controller working to switch the plurality of switching elements on and off during the multiphase motor being inactivated and the power generator generating the power to thereby step down the voltage of the first power storage device and charge the second power storage device by the stepped-down voltage.

13. The power supply system according to claim 12, wherein the power generator operates in a power generation mode to generate the power during the motor vehicle being decelerated, and operates in a power-generation inhibiting mode to inhibit generation of the power during the motor vehicle being driven at least except when being decelerated, and wherein, during the power generator operating in the power-generation inhibiting mode, when the voltage of the first power storage device is less than a predetermined threshold, the power generator works to stop the power-generation inhibiting mode to thereby charge the first power storage device.

14. The power supply system according to claim 11, wherein the power generator works to charge the first and second power storage devices, and the controller works to, even though the multiphase motor being inactivated, switch the plurality of switching elements on and off to thereby boost the voltage of the second power storage device to charge the first power storage device by the boosted voltage when the voltage of the first power storage device is less than a predetermined threshold.

15. The power supply system according to claim 11, wherein the controller works to stop the stepping-down of the voltage of the first power storage device when the voltage of the second power storage device is equal to or greater than a predetermined threshold.

16. The power supply system according to claim 11, wherein the controller works to switch the plurality of switching elements on and off to thereby step down the voltage of the first power storage device so that the stepped-down voltage is equal to or lower than the half of the voltage of the first power storage device.

17. The power supply system according to claim 1, further comprising a switching circuit electrically connected between the neutral point of the multiphase stator windings and the first power storage device, the switching circuit being electrically connected with the controller so as to be turned on or off under control of the controller, wherein, when boosting the voltage of the second power storage device, the controller drives the switching circuit on to thereby electrically connect between the neutral point of the multiphase stator windings and the first power storage device.

18. The power supply system according to claim 11, further comprising a switching circuit electrically connected between the neutral point of the multiphase stator windings and the second power storage device, the switching circuit being electrically connected with the controller so as to be turned on or off under control of the controller, wherein, when stepping down the voltage of the first power storage device, the controller drives the switching circuit on to thereby electrically connect between the neutral point of the multiphase stator windings and the second power storage device.

19. The power supply system according to claim 1, wherein at least one of the first and second power storage devices is composed of a capacitor.

20. The power supply system according to claim 11, wherein at least one of the first and second power storage devices is composed of a capacitor.

21. The power supply system according to claim 1, wherein the multiphase motor is one of: a motor for a starter system that causes an engine to start running, a motor for an electric power steering system that assists a driver's operation of a steering wheel of a vehicle a motor for a stabilizer system that keeps a state of a vehicle controllable, and a motor for a compressor of an air-conditioning system.

22. The power supply system according to claim 11, wherein the multiphase motor is one of: a motor for a starter system that causes an engine to start running, a motor for an electric power steering system that assists a driver's operation of a steering wheel of a vehicle, a motor for a stabilizer system that keeps a state of a vehicle controllable, and a motor for a compressor of an air-conditioning system.

* * * * *